(12) United States Patent
Goshima et al.

(10) Patent No.: US 7,678,345 B2
(45) Date of Patent: Mar. 16, 2010

(54) HOLDING SEALING MATERIAL, EXHAUST GAS PURIFYING APPARATUS AND METHOD FOR MANUFACTURING EXHAUST GAS PURIFYING APPARATUS

(75) Inventors: Noritsuna Goshima, Takahama (JP); Tomohide Shinohara, Takahama (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 12/256,630

(22) Filed: Oct. 23, 2008

(65) Prior Publication Data

US 2010/0007094 A1   Jan. 14, 2010

(30) Foreign Application Priority Data

Jul. 10, 2008   (WO) ................ PCT/JP2008/062495

(51) Int. Cl.
*B01D 50/00* (2006.01)
(52) U.S. Cl. .................................... 422/179
(58) Field of Classification Search ............... 422/168, 422/177, 179, 180
See application file for complete search history.

(56) References Cited

U.S. PATENT DOCUMENTS

| | | | |
|---|---|---|---|
| 6,245,301 B1 * | 6/2001 | Stroom et al. ............... 422/179 |
| 6,960,386 B2 | 11/2005 | Agata | |
| 2003/0049180 A1 | 3/2003 | Fukushima | |
| 2004/0022699 A1 | 2/2004 | Fukushima | |
| 2004/0052694 A1 | 3/2004 | Nishikawa et al. | |
| 2004/0062690 A1 | 4/2004 | Tanaka et al. | |
| 2004/0234428 A1 | 11/2004 | Tanahashi et al. | |
| 2006/0278323 A1 | 12/2006 | Eguchi | |
| 2007/0207069 A1 | 9/2007 | Kariya et al. | |
| 2007/0231222 A1 | 10/2007 | Okabe | |
| 2007/0292318 A1 | 12/2007 | Andoh et al. | |
| 2008/0044317 A1 | 2/2008 | Kariya et al. | |
| 2008/0047638 A1 | 2/2008 | Sugino | |
| 2008/0178566 A1 | 7/2008 | Okabe | |
| 2008/0181831 A1 | 7/2008 | Okabe | |
| 2008/0312071 A1 | 12/2008 | Nishikawa et al. | |
| 2009/0049690 A1 | 2/2009 | Eguchi | |
| 2009/0072498 A1 | 3/2009 | Tanahashi et al. | |
| 2009/0075812 A1 | 3/2009 | Tanahashi et al. | |
| 2009/0081442 A1 | 3/2009 | Tanahashi et al. | |
| 2009/0081455 A1 | 3/2009 | Mitani | |

FOREIGN PATENT DOCUMENTS

DE          3939392          6/1990

(Continued)

*Primary Examiner*—Tom Duong
(74) *Attorney, Agent, or Firm*—Ditthavong Mori & Steiner, P.C.

(57) ABSTRACT

A holding sealing material has a mat shape and includes an adsorption portion, a holding portion, and a coupling portion. The adsorption portion is configured to adsorb urea and has a width and a longer side face extending along a longitudinal direction of the holding sealing material. The holding portion is configured to hold an exhaust gas treating body and has another width and another longer side face extending along the longitudinal direction. The width of the adsorption portion is smaller than the width of the holding portion. The longer side face of the adsorption portion faces the longer side face of the holding portion via a space. The coupling portion connects the adsorption portion and the holding portion.

8 Claims, 19 Drawing Sheets

FOREIGN PATENT DOCUMENTS

| | | |
|---|---|---|
| DE | 29518939 | 2/1996 |
| EP | 1403478 | 3/2004 |
| JP | 61-181816 U | 11/1986 |
| JP | 2-050012 U | 4/1990 |
| JP | 7-259545 | 10/1995 |
| JP | 2000-513064 | 10/2000 |
| JP | 2003-262117 | 9/2003 |
| JP | 2004-124719 | 4/2004 |
| WO | WO 97/48889 | 12/1997 |
| WO | WO 02/38922 | 5/2002 |
| WO | WO 2006/088733 | 8/2006 |

\* cited by examiner

HOLDING SEALING MATERIAL, EXHAUST GAS PURIFYING APPARATUS AND METHOD FOR MANUFACTURING EXHAUST GAS PURIFYING APPARATUS

CROSS-REFERENCE TO RELATED APPLICATIONS

The present application claims priority under 35 U.S.C. §119 to PCT Application No. PCT/JP2008/062495, filed Jul. 10, 2008, the contents of which are incorporated herein by reference in their entirety.

BACKGROUND OF THE INVENTION

1. Field of the Invention

The present invention relates to a holding sealing material, an exhaust gas purifying apparatus, and a method for manufacturing an exhaust gas purifying apparatus.

2. Discussion of the Background

Particulate matters (hereinafter, also referred to as PMs) are contained in exhaust gases discharged from internal combustion engines such as diesel engines, and in recent years, there has arisen a serious problem as these PMs are harmful to the environment and the human bodies. Moreover, since exhaust gases also contain toxic gas components such as CO, HC, and NOx, there have been growing concerns about influences of these toxic gas components on the environment and the human bodies.

In view of these, as an exhaust gas purifying apparatus for collecting PMs in exhaust gases and for purifying the toxic gas components, various exhaust gas purifying apparatuses have been proposed. Each of the exhaust gas purifying apparatuses is configured by: an exhaust gas treating body made of porous ceramics, such as silicon carbide and cordierite; a casing configured to house the exhaust gas treating body; and a holding sealing material made of an inorganic fiber aggregated body that is disposed between the exhaust gas treating body and the casing. This holding sealing material is installed mainly for purposes of preventing the exhaust gas treating body from being damaged upon contact with the casing that covers its periphery due to vibrations and impacts caused by traveling or the like of an automobile and for preventing exhaust gases from leaking between the exhaust gas treating body and the casing (for example, see WO 02/38922).

In recent years, a technique referred to as a urea SCR (Selective Catalyst Reaction) has been examined as a method for converting NOx in exhaust gases.

The urea SCR system sprays urea water in an exhaust gas purifying apparatus, and ammonia is generated by thermal decomposition of urea so that NOx undergoes a reduction reaction by ammonia.

FIG. 1 is a cross-sectional view that schematically shows a state where urea water is sprayed in an exhaust gas purifying apparatus having a conventional holding sealing material.

An exhaust gas purifying apparatus 1020, shown in FIG. 1, has a structure in which a holding sealing material 1010 is wound around an exhaust gas treating body 30 made of a honeycomb structure (a catalyst supporting carrier), and this is disposed inside a casing 40, and a urea spray opening 100 configured to spray urea water 110 is formed on a portion near the exhaust gas treating body 30 (on the upstream side of exhaust gases) through which exhaust gases are allowed to flow into the exhaust gas treating body 30.

In the urea SCR system, the urea water is sprayed toward the exhaust gas treating body. Then, urea contained in the urea water is thermally decomposed by heat of the exhaust gases to generate ammonia so that ammonia and NOx in the exhaust gases undergo a reduction reaction to form N2 by a function of a catalyst supported on the exhaust gas treating body; thus, NOx is converted. Moreover, the exhaust gases in which NOx has been converted are discharged from the downstream side of the exhaust gas treating body.

The contents of WO 02/38922 are incorporated herein by reference in their entirety.

SUMMARY OF THE INVENTION

According to one aspect of the present invention, a holding sealing material has a mat shape and includes an adsorption portion, a holding portion, and a coupling portion. The adsorption portion is configured to adsorb urea and has a width and a longer side face extending along a longitudinal direction of the holding sealing material. The holding portion is configured to hold an exhaust gas treating body and has another width and another longer side face extending along the longitudinal direction. The width of the adsorption portion is smaller than the width of the holding portion. The longer side face of the adsorption portion faces the longer side face of the holding portion via a space. The coupling portion connects the adsorption portion and the holding portion.

According to another aspect of the present invention, a holding sealing material has a mat shape and includes an adsorption portion and a holding portion. The adsorption portion is configured to adsorb urea and has a width and a longer side face extending along a longitudinal direction of the holding sealing material. The holding portion is configured to hold an exhaust gas treating body and has another width and another longer side face extending along the longitudinal direction. The width of the adsorption portion is smaller than the width of the holding portion. The longer side face of the adsorption portion and the longer side face of the holding portion are separated from each other entirely.

According to further aspect of the present invention, an exhaust gas purifying apparatus includes an exhaust gas treating body, a casing and the above described holding sealing material. The exhaust gas treating body has a plurality of partition walls extending to define a plurality of through holes. The casing has a gas inlet and contains the exhaust gas treating body therein. The holding sealing material is disposed between the exhaust gas treating body and the casing to hold the exhaust gas treating body in the casing. The adsorption portion of the holding sealing material is disposed between the gas inlet and the holding portion of the holding sealing material.

According to the other aspect of the present invention, a method for manufacturing an exhaust gas purifying apparatus includes manufacturing an exhaust gas treating body having a plurality of partition walls extending to define a plurality of through holes. A holding sealing material having a mat shape is provided. The holding sealing material includes an adsorption portion, a holding portion, and a coupling portion. The adsorption portion is configured to adsorb urea and has a width and a longer side face extending along a longitudinal direction of the holding sealing material. The holding portion is configured to hold an exhaust gas treating body and has another width and another longer side face extending along the longitudinal direction. The width of the adsorption portion is smaller than the width of the holding portion. The longer side face of the adsorption portion faces the longer side face of the holding portion via a space. The coupling portion connects the adsorption portion and the holding portion. The holding sealing material is wound around a side face of the exhaust gas treating body. The exhaust gas treating body around which the holding sealing material is wound is inserted into a casing so that an adsorption portion of the holding sealing material is disposed between the gas inlet of the casing and the holding portion of the holding sealing material.

According to yet the other aspect of the present invention, a method for manufacturing an exhaust gas purifying apparatus includes manufacturing an exhaust gas treating body having a plurality of partition walls extending to define a plurality of through holes. A holding sealing material having a mat shape is provided. The holding sealing material includes an adsorption portion and a holding portion. The adsorption portion is configured to adsorb urea and has a width and a longer side face extending along a longitudinal direction of the holding sealing material. The holding portion is configured to hold an exhaust gas treating body and has another width and another longer side face extending along the longitudinal direction. The width of the adsorption portion is smaller than the width of the holding portion. The longer side face of the adsorption portion and the longer the face of the holding portion is separated from each other entirely. The holding sealing material is wound around a side face of the exhaust gas treating body. The exhaust gas treating body around which the holding sealing material is wound is inserted into a casing so that an adsorption portion of the holding sealing material is disposed between the gas inlet of the casing and the holding portion of the holding sealing material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
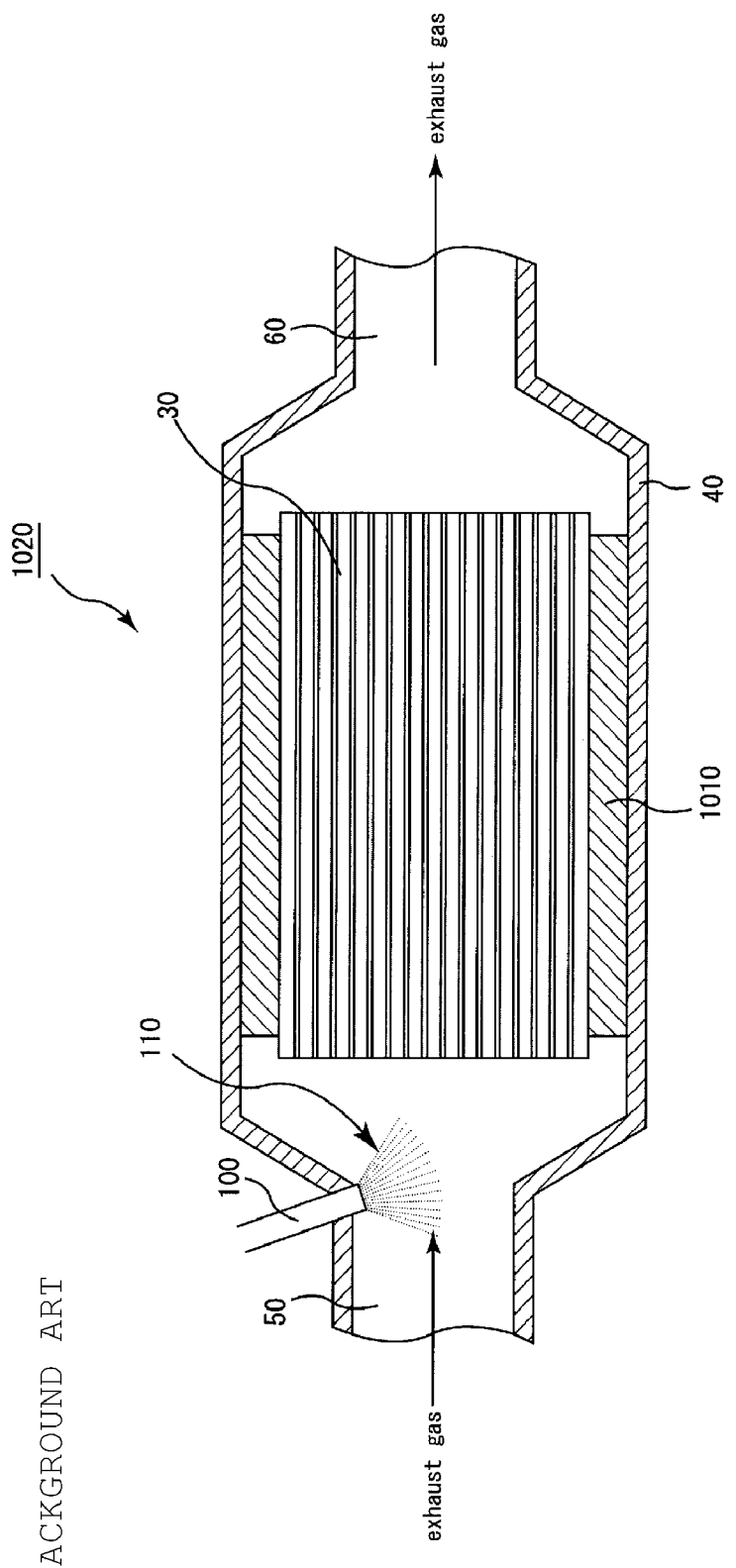
FIG. 1 is a cross-sectional view that schematically shows a state where urea water is sprayed in an exhaust gas purifying apparatus having a conventional holding sealing material.

The embodiments will now be described with reference to the accompanying drawings, wherein like reference numerals designate corresponding or identical elements throughout the various drawings.

A holding sealing material according to embodiments of the present invention has a mat shape, and includes: an adsorption portion configured to adsorb urea; and a holding portion configured to hold an exhaust gas treating body, a longer side face of the adsorption portion and a longer side face of the holding portion facing each other, with a space being interposed therebetween, the adsorption portion and the holding portion being coupled to each other, with a coupling portion interposed therebetween, the adsorption portion having a width smaller than a width of the holding portion.

The adsorbing portion is a portion where urea water is absorbed so that urea in the urea water is adsorbed thereon. When the adsorbing portion is disposed on the upstream side of exhaust gases in an exhaust gas purifying apparatus, that is, on the side where the urea water is sprayed, the sprayed urea water is absorbed in the adsorbing portion so that urea contained in the urea water is adsorbed on the adsorbing portion.

The holding portion is a portion configured to hold an exhaust gas treating body in the exhaust gas purifying apparatus, and a longer side face of the adsorption portion and a longer side face of the holding portion face each other, with a space interposed therebetween. When a space is formed between the longer side face of the adsorption portion and the longer side face of the holding portion, urea water, absorbed in the adsorption portion of the holding sealing material wound around the exhaust gas treating body, is more likely to be prevented from permeating into the holding portion.

That is, in the exhaust gas purifying apparatus used for a urea SCR system, the holding portion of the holding sealing material is more likely to be prevented from being hardened by crystallization of urea even when the holding sealing material has been held for a long period under a high temperature.

Moreover, in the holding sealing material according to the embodiments of the present invention, the adsorption portion has a width smaller than the width of the holding portion. That is, most of the function of the holding sealing material for holding the exhaust gas treating body is executed by the holding portion.

As described above, when the holding sealing material according to the embodiments of the present invention is used, the holding portion of the holding sealing material tends to be prevented from being hardened, even when the holding sealing material has been held under a high temperature for a long period inside the exhaust gas purifying apparatus used for a urea SCR system. For this reason, it maybe easier to favorably keep holding the exhaust gas treating body by the holding portion.

That is, the holding sealing material according to the embodiments of the present invention may make it easier to maintain high holding strength even after a long term use, when it is applied to the exhaust gas purifying apparatus used for a urea SCR system.

Moreover, in a case where the adsorption portion and the holding portion are coupled through a coupling portion, since the holding sealing material tends to be wound around the exhaust gas treating body by a one-time winding operation, it may be easier to obtain superior operability upon manufacturing an exhaust gas purifying apparatus.

A holding sealing material according to the embodiments of the present invention has a mat shape, and includes: an adsorption portion configured to adsorb urea; and a holding portion configured to hold an exhaust gas treating body, a longer side face of the adsorption portion and a longer side face of the holding portion being separated from each other and facing each other, as a whole, the adsorption portion having a width smaller than a width of the holding portion.

When a holding sealing material, with the longer side face of the adsorption portion and the longer side face of the holding portion being separated from each other and facing each other as a whole, is wound around the exhaust gas treating body, a space may be interposed more easily between the longer side face of the adsorption portion and the longer side face of the holding portion. When such a holding sealing material is used, it may be easier to prevent urea water absorbed in the adsorption portion of the holding sealing material wound around the exhaust gas treating body from permeating into the holding portion.

That is, in the same manner as in a case where the holding sealing material according to the embodiments of the present invention is used, in the exhaust gas purifying apparatus used in the urea SCR system, it may be easier to prevent the holding portion of the holding sealing material from being hardened by crystallization of urea even when the holding sealing material has been held for a long period under a high temperature.

That is, the holding sealing material according to the embodiments of the present invention may make it easier to maintain high holding strength even after a long term use, when it is applied to the exhaust gas purifying apparatus used for a urea SCR system.

In the holding sealing material according to the embodiments of the present invention, the adsorption portion and the holding portion are prepared as different members.

In a case where the adsorption portion and the holding portion are prepared as different members, by separately winding the adsorption portion and the holding portion around the exhaust gas treating body, an exhaust gas purifying apparatus may be prepared more easily, with a space being formed between the adsorption portion and the holding portion. In this case, since the adsorption portion and the holding portion are separated from each other with a space interposed therebetween, and since no coupled portion is disposed between the adsorption portion and the holding portion, permeation of urea water into the holding portion tends to be further prevented, which may make it easier to surely prevent the holding portion from being hardened. For this reason, the holding sealing material according to the embodiments of the present invention may make it easier to further maintain high holding strength even after a long term use, when it is applied to the exhaust gas purifying apparatus used for a urea SCR system.

In the holding sealing material according to the embodiments of the present invention, the longer side face of the adsorption portion and the longer side face of the holding portion are bonded to each other by using a bonding portion including a flammable material.

In a case where the adsorption portion and the holding portion are bonded to each other through the bonding portion, since the holding sealing material tends to be wound around the exhaust gas treating body by a one-time winding operation, it may be easier to obtain superior operability upon manufacturing an exhaust gas purifying apparatus.

Moreover, since the bonding portion includes a flammable material, the bonding portion burns and disappears by a temperature rise inside the exhaust gas purifying apparatus, when the holding sealing material is used in an exhaust gas purifying apparatus, with the result that a portion in which the bonding portion existed is formed into a space. That is, the space tends to be formed between the adsorption portion and the holding portion.

When the adsorption portion and the holding portion are separated from each other by the space, it may be easier to further prevent urea water from permeating into the holding portion from the adsorption portion.

That is, by applying the holding sealing material according to the embodiments of the present invention to an exhaust gas purifying apparatus to be used for a urea SCR system, the exhaust gas purifying apparatus may be more easily manufactured, and it may be easier to maintain high holding strength even after a long term use.

In the holding sealing material according to the embodiments of the present invention, a holding member is disposed between the longer side face of the adsorption portion and the longer side face of the holding portion, the holding member including a material that hardly absorbs liquid in comparison with the adsorption portion.

In a case where, upon applying the holding sealing material to an exhaust gas purifying apparatus to be used for a urea SCR system, a holding member that hardly absorbs liquid is disposed between the adsorption portion and the holding portion, since urea water hardly permeates from the adsorption portion to the holding member, it may be easier to prevent urea water from permeating into the holding portion by the holding member. For this reason, it may be easier to maintain high holding strength even after a long term use of the exhaust gas purifying apparatus.

In the holding sealing material according to the embodiments of the present invention, the holding member includes a material having a porosity smaller than a porosity of the adsorption portion. In the holding sealing material according to the embodiments of the present invention, the holding member includes a wire mesh.

Since the holding member including such a material hardly absorbs liquid, it may be easier to prevent urea water from permeating into the holding portion, even upon applying the holding sealing material to an exhaust gas purifying apparatus to be used for a urea SCR system, and consequently to maintain high holding strength even after a long term use of the exhaust gas purifying apparatus.

In the holding sealing material according to the embodiments of the present invention, the adsorption portion and the holding portion include different materials. In the holding sealing material according to the embodiments of the present invention, the adsorption portion includes a material having a porosity larger than a porosity of the holding portion. In the holding sealing material according to the embodiments of the present invention, the adsorption portion and the holding portion include inorganic fibers, and the inorganic fibers forming the adsorption portion have an average fiber diameter that is smaller than an average fiber diameter of the inorganic fibers forming the holding portion.

When the adsorption portion and the holding portion include different materials as described above, liquid is less likely to permeate into the holding portion from the adsorption portion. For this reason, upon applying the holding sealing material to an exhaust gas purifying apparatus to be used for a urea SCR system, it may be easier to surely prevent urea water from permeating into the holding portion, and consequently to maintain high holding strength even after a long term use of the exhaust gas purifying apparatus.

An exhaust gas purifying apparatus according to the embodiments of the present invention includes: an exhaust gas treating body in which a large number of through holes are longitudinally disposed in parallel with one another, with a partition wall being interposed therebetween; a casing configured to house the exhaust gas treating body; and a holding sealing material configured to hold the exhaust gas treating body, the holding sealing material being disposed between the exhaust gas treating body and the casing, the holding sealing material being the holding sealing material according to the embodiments of the present invention, the adsorption portion of the holding sealing material being disposed at a position closer to a gas inlet side relative to the holding portion of the holding sealing material.

With this arrangement, since, upon applying the exhaust gas purifying apparatus to a urea SCR system, urea water is more likely to be prevented from permeating into the holding portion, it may be easier to maintain high holding strength even after a long term use of the exhaust gas purifying apparatus.

A method for manufacturing an exhaust gas purifying apparatus according to the embodiments of the present invention includes: manufacturing an exhaust gas treating body in which a large number of through holes are longitudinally disposed in parallel with one another, with a partition wall being interposed therebetween; winding the holding sealing material according to the embodiments of the present invention around a side face of the exhaust gas treating body; and inserting the exhaust gas treating body, with the holding sealing material wound around, into a casing so that an adsorption portion of the holding sealing material is positioned closer to a gas inlet side relative to a holding portion of the holding sealing material.

With this process, it may be easier to manufacture an exhaust gas purifying apparatus that tends to maintain high holding strength even after a long term use of the urea SCR system to which it is applied.

First Embodiment

The following description will discuss a first embodiment as one embodiment of a holding sealing material, an exhaust gas purifying apparatus and a method for manufacturing the exhaust gas purifying apparatus in accordance with the embodiments of the present invention.

First, an exhaust gas purifying apparatus having the holding sealing material according to the embodiments of the present invention is described.

Figure 2:
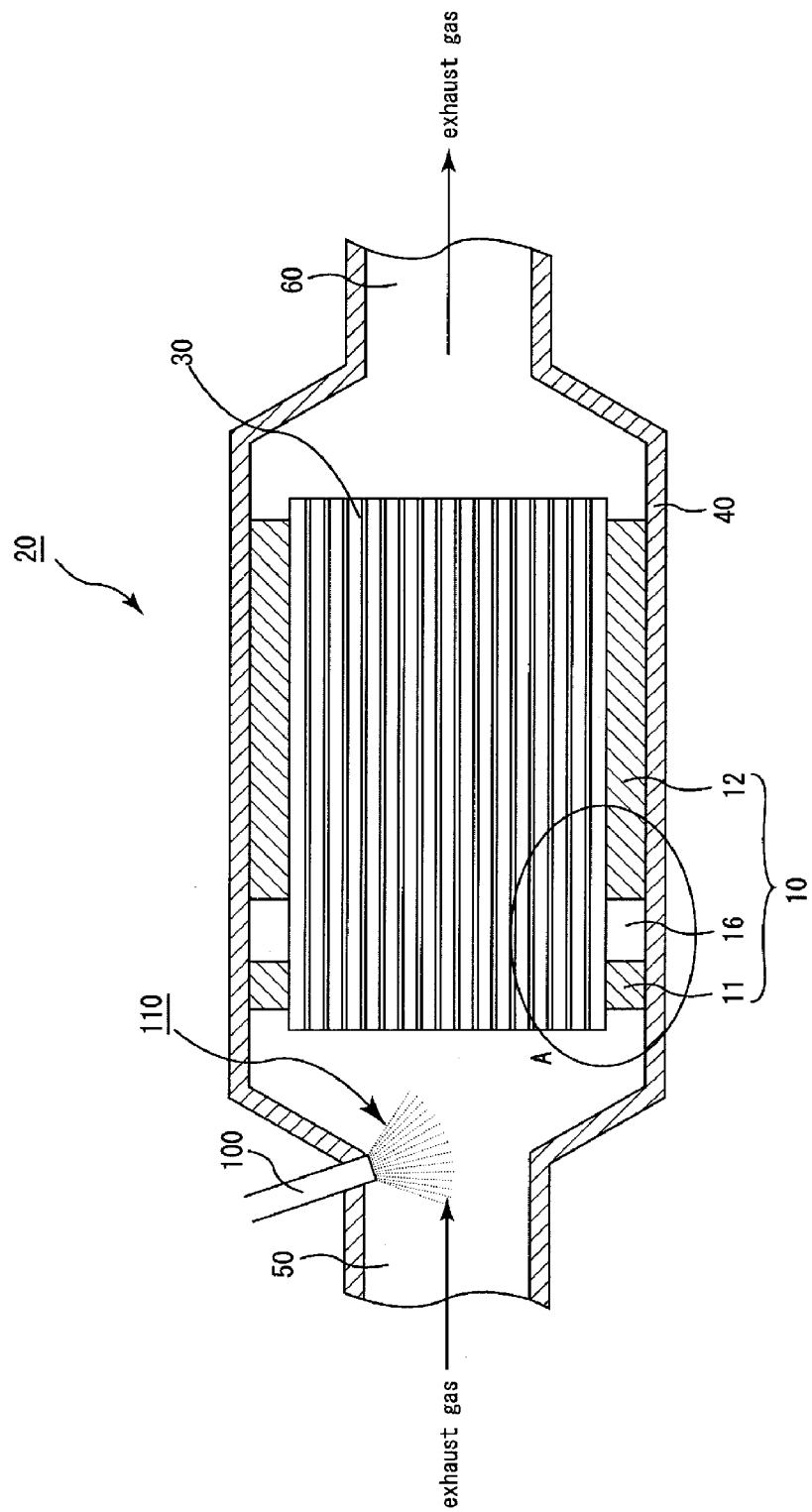
FIG. 2 is a cross-sectional view that schematically shows one example of an exhaust gas purifying apparatus having the holding sealing material according to one embodiment of the present invention.

FIG. 2 is a cross-sectional view that schematically shows one example of an exhaust gas purifying apparatus having the holding sealing material according to one embodiment of the present invention.

An exhaust gas purifying apparatus 20 shown in FIG. 2 is provided with: a pillar-shaped exhaust gas treating body 30 including porous ceramics, in which a large number of through holes are longitudinally disposed in parallel with one another, with a partition wall being interposed therebetween; a casing 40 configured to house the exhaust gas treating body 30; and a holding sealing material 10 configured to hold the exhaust gas treating body 30, the holding sealing material being disposed between the exhaust gas treating body 30 and the casing 40.

Connected to end portions of the casing 40, if necessary, are: an inlet pipe 50 configured to introduce exhaust gases discharged from an internal combustion engine into an exhaust gas purifying apparatus; and an outlet pipe 60 configured to discharge the exhaust gases that have passed through the exhaust gas purifying apparatus out of the exhaust gas purifying apparatus.

Moreover, a urea spray opening 100 configured to spray urea water upon using the exhaust gas purifying apparatus 20 used for a urea SCR system is attached to the inlet side of exhaust gases.

In the exhaust gas purifying apparatus 20, the holding sealing material 10 is wound around the exhaust gas treating body 30, and the holding sealing material 10 has an adsorption portion 11 and a holding portion 12. There is a space 16 between the adsorption portion 11 and the holding portion 12.

The adsorption portion 11 is located on the same side as the side of the urea spray opening 100; the adsorption portion 11 is located on the inlet side of exhaust gases, namely, on the gas inlet side from which exhaust gases are allowed to flow into the exhaust gas treating body.

In the exhaust gas purifying apparatus 20 having this structure, when urea water 110 is sprayed from the urea spray opening 100, a portion of the urea water 110 is absorbed in the adsorption portion 11 of the holding sealing material 10.

However, since the adsorption portion 11 and the holding portion 12 are separated by the space 16, the urea water absorbed in the adsorption portion 11 is less likely to reach the holding portion 12.

For this reason, there is less likely to be reduction in the elasticity of the holding sealing material caused by crystallization of urea in the holding portion 12, and the holding strength of the holding sealing material 10 is consequently less likely to be reduced even when the exhaust gas purifying apparatus 20 is used in a urea SCR system for a long period.

Figure 3:
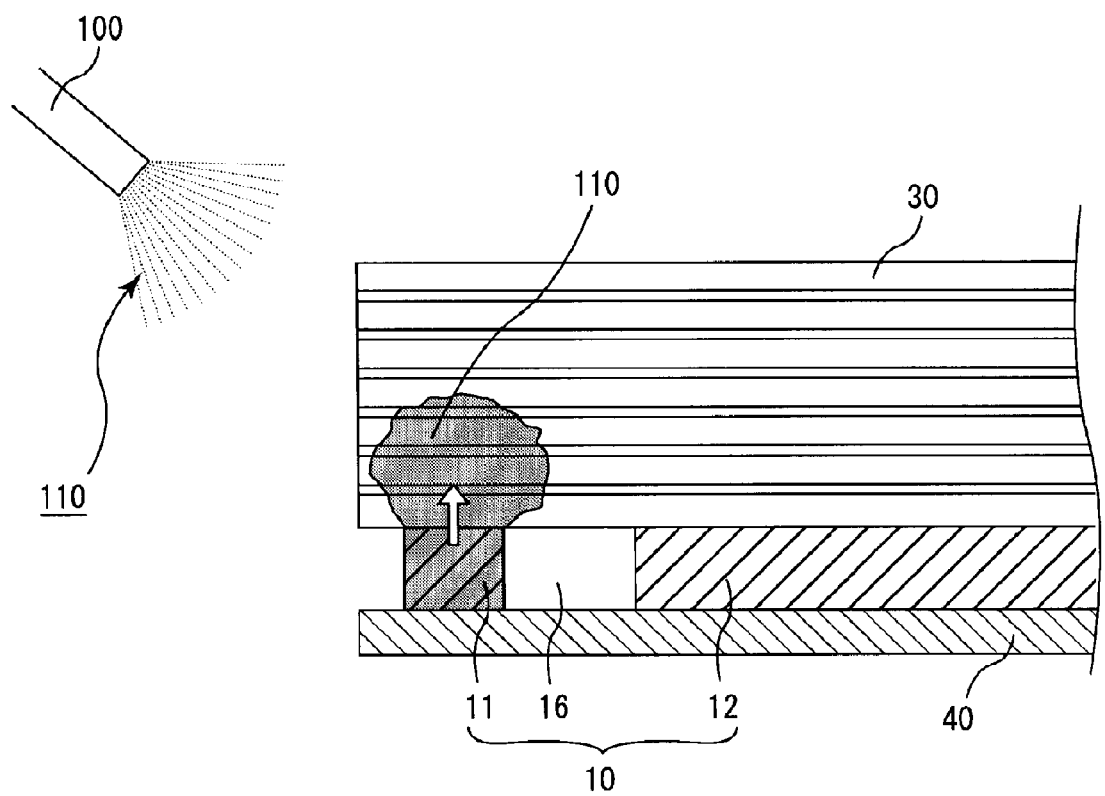
FIG. 3 is a partial cross-sectional view that schematically shows an area indicated by A in an enlarged manner in the exhaust gas purifying apparatus shown in FIG. 2.

FIG. 3 is a partial cross-sectional view that schematically shows an area indicated by A in an enlarged manner in the exhaust gas purifying apparatus shown in FIG. 2.

In FIG. 3, of urea water to be permeated into the exhaust gas treating body, only the urea water that permeates into the exhaust gas treating body through the adsorption portion is shown schematically, and a direction in which the urea water permeates is indicated by an arrow.

As described above, the urea water 110 is absorbed in the adsorption portion 11 of the holding sealing material 10.

In this case, since the exhaust gas treating body 30 includes porous ceramics, moisture contained in a portion (in this case, the adsorption portion 11 of the holding sealing material 10) adjacent to the exhaust gas treating body 30 is presumably absorbed into the exhaust gas treating body 30 by a capillary phenomenon.

For this reason, a portion of the urea water 110 absorbed in the adsorption portion 11 is permeated into the exhaust gas treating body 30. Since urea water generates ammonia when thermally decomposed, it serves to convert NOx inside the exhaust gas treating body 30.

That is, urea water 110 tends to be introduced into the exhaust gas treating body 30 through the adsorption portion 11 of the holding sealing material 10 so that by increasing the rate of urea water to serve to purify NOx in the urea SCR system, NOx tends to be more efficiently converted.

With this arrangement, it may be easier to reduce the use amount of urea water, with the NOx converting performance being maintained in a high level, and consequently to reduce the number of refilling operations of urea water.

The following description will discuss a holding sealing material, an exhaust gas treating body and a casing according to the first embodiment of the present invention, which are used for an exhaust gas purifying apparatus shown in FIG. 2.

First, the following description will discuss the holding sealing material.

Figure 4:
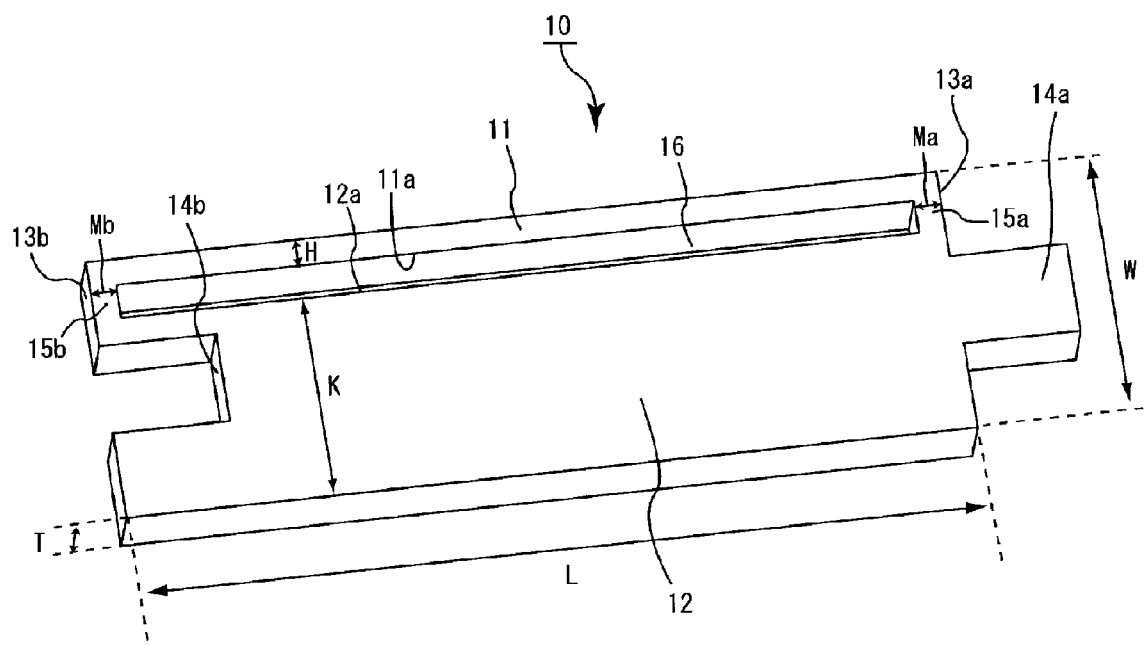
FIG. 4 is a perspective view that schematically shows one example of a holding sealing material in accordance with the first embodiment of the present invention.

FIG. 4 is a perspective view that schematically shows one example of a holding sealing material in accordance with the first embodiment of the present invention.

The holding sealing material of the present embodiment mainly includes inorganic fibers, and as shown in FIG. 4, it is formed into a flat plate shape (mat shape) having virtually a rectangular shape, when viewed in a plane, with a predetermined length (indicated by an arrow L in FIG. 4), width (indicated by an arrow W in FIG. 4) and thickness (indicated by an arrow T in FIG. 4).

Moreover, of the respective end portions of the holding sealing material 10, each of the end faces in parallel with the width direction is referred to as an end face 13*a* and an end face 13*b*. A projected portion 14*a* is formed on one end face 13*a* while a recessed portion 14*b* is formed on the other end face 13*b*. The recessed portion 14*b* has a shape to be fitted with the projected portion 14*a* when the holding sealing material 10 is folded and the end face 13*a* and the end face 13*b* are made in contact with each other.

The holding sealing material 10 has a space 16 that is cut out into a rectangular shape in parallel with the length direction.

Moreover, a plate-shaped adsorption portion 11 having a rectangular shape when viewed in a plane is located on the upper side of the space 16 in FIG. 4.

Furthermore, a plate-shaped holding portion 12 having a rectangular shape when viewed in a plane is located on the lower side of the space 16 in FIG. 4.

The shape referred to as "a plate shape having a rectangular shape when viewed in a plane" may be a shape having a recessed portion and a projected portion as shown in FIG. 4, or may be a shape without a recessed portion and a projected portion.

In the adsorption portion 11 and the holding portion 12, a longer side face 11*a* of the adsorption portion 11 and a longer side face 12*a* of the holding portion 12 face each other with the space 16 interposed therebetween. The longer side faces of the adsorption portion 11 and the holding portion 12 refer to faces of the holding sealing material that are in parallel with each other in the length direction.

In FIG. 4, the width of the adsorption portion 11 is a length indicated by a double-pointed arrow H, and the width of the holding portion 12 is a length indicated by a double-pointed arrow K. In the holding sealing material 10 of the present embodiment, the width H of the adsorption portion 11 is smaller than the width K of the holding portion 12.

Moreover, the width of the space 16 is desirably about 1 mm or more.

When the width is about 1 mm or more, urea water is less likely to permeate into the holding portion.

The adsorption portion 11 and the holding portion 12 are coupled to each other through coupling portions 15*a* and 15*b* so that the holding sealing material 10 is formed into an integrated holding sealing material as a whole.

The total width of the coupling portions (the total length indicated by an arrow Ma and an arrow Mb in FIG. 4) is desirably at least about 5% and at most about 50% of the length (length indicated by L in FIG. 4) of the longer side face of the holding sealing material.

When the width of the coupling portion is about 5% or more, the rigidity of the coupling portion tends not to be insufficient, which is less likely to cause a difficulty in winding the holding sealing material around an exhaust gas treating body by a one-time winding operation.

Moreover, in a case where the width of the coupling portion is about 50% or less, since the rate of portions occupied by the space tends not to be smaller, urea water is less likely to permeate into the holding portion.

The holding sealing material 10 is desirably prepared as a needle mat obtained by carrying out a needling treatment on a base mat including inorganic fibers. The needling treatment refers to a process in which a fiber entangling means such as a needle is inserted into and removed from the base mat. In the holding sealing material 10, inorganic fibers having a comparatively long average fiber length are entangled with one another three-dimensionally by the needling treatment.

Moreover, the inorganic fibers have an average fiber length in a certain level to form the entangled structure, and, for example, the average fiber length of the inorganic fibers is desirably at least about 50 μm and at most about 100 mm.

Moreover, the holding sealing material of the present embodiment may contain a binder such as an organic binder, so as to suppress the volume of the holding sealing material and to enhance the operability prior to the assembling processes of the exhaust gas purifying apparatus.

Figure 5A:
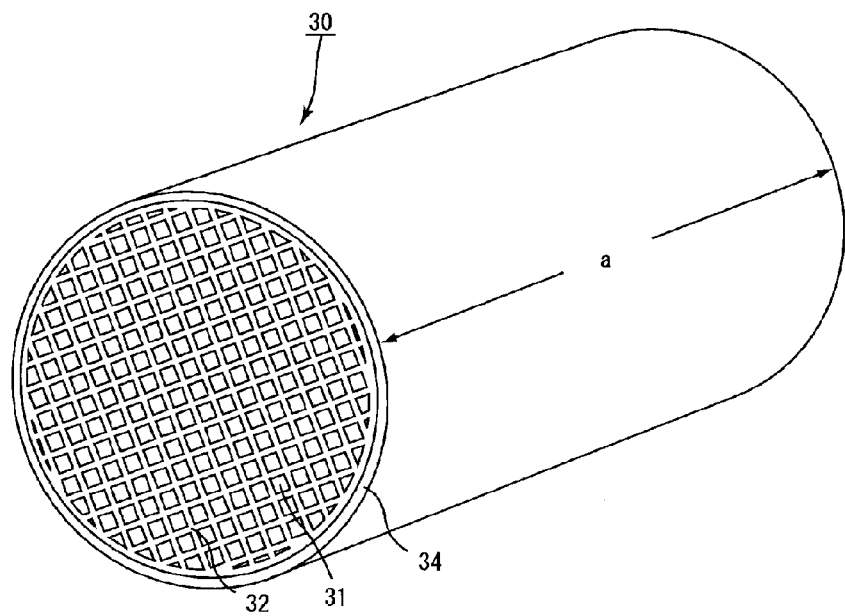
FIG. 5A is a perspective view that schematically shows one example of an exhaust gas treating body that is one component of the exhaust gas purifying apparatus of the first embodiment.
Figure 5B:
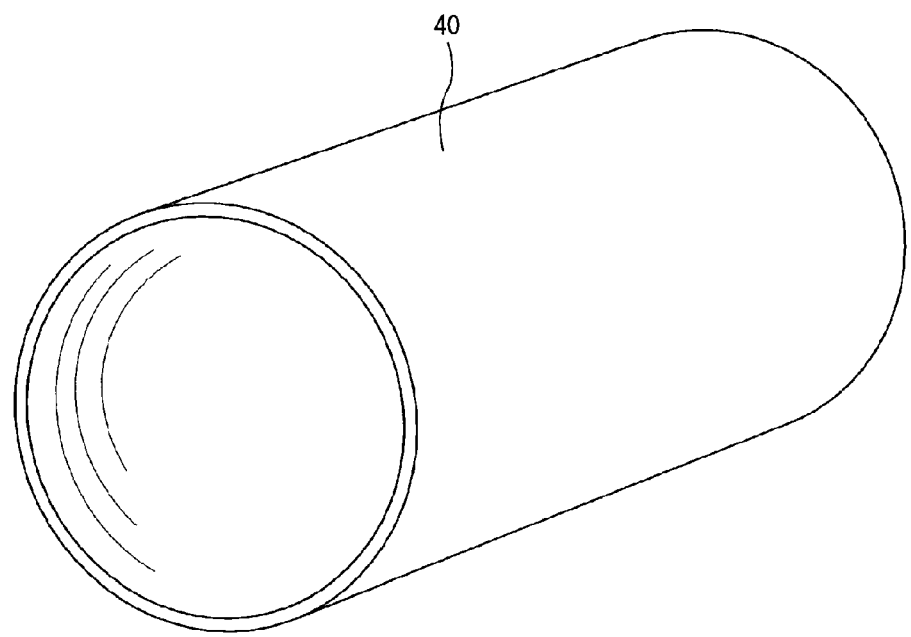
FIG. 5B is a perspective view that schematically shows one example of the casing that is one component of the exhaust gas purifying apparatus of the first embodiment.

Next, referring to FIG. 5A and FIG. 5B, the following description will discuss the exhaust gas treating body and the casing that form an exhaust gas purifying apparatus 20.

FIG. 5A is a perspective view that schematically shows one example of an exhaust gas treating body that is one component of the exhaust gas purifying apparatus of the first embodiment, and FIG. 5B is a perspective view that schematically shows one example of the casing that is one component of the exhaust gas purifying apparatus of the first embodiment.

An exhaust gas treating body 30 shown in FIG. 5A mainly includes porous ceramics, and it is formed into a round pillar shape. The exhaust gas treating body 30 is provided with a large number of through holes 31, and a catalyst that accelerates a reduction reaction of NOx is supported inside each through hole.

The through holes 31 are separated from each other by a partition wall 32.

For this reason, NOx, contained in exhaust gases that have been allowed to flow into the through holes 31 of the exhaust gas treating body 30, is allowed to react with ammonia generated by the decomposition of urea contained in urea water to be decomposed into N2 and H2O inside the exhaust gas treating body.

Moreover, a sealing material layer 34 is formed on the periphery of the exhaust gas treating body 30 for the purposes of reinforcing the peripheral portion of the exhaust gas treating body 30 and adjusting the shape of the peripheral portion thereof, and improving the heat insulating property of the exhaust gas treating body 30.

A casing 40, shown in FIG. 5B, is mainly made of metal such as stainless, and it is formed into a round pillar shape. Moreover, its inner diameter is slightly shorter than the total combined length of the diameter of the end face of the exhaust gas treating body 30 and the thickness of the holding sealing material 10 wound around the exhaust gas treating body 30, and its length is virtually the same as the length of the exhaust gas treating body 30 in the longitudinal direction (direction indicated by an arrow a in FIG. 5A).

Next, the following description will discuss a method for manufacturing a holding sealing material and an exhaust gas purifying apparatus of the present embodiment.

First, a needle mat having a predetermined overall length is prepared as a mat to form a holding sealing material. The needle mat is manufactured by carrying out the needling treatment on a base mat. The base mat has a structure in which inorganic fibers having a predetermined average fiber length are loosely entangled with one another through a spinning process. By carrying out the needling treatment on the inorganic fibers thus loosely entangled with one another, the inorganic fibers are entangled with one another more complicatedly so that a mat having an entangled structure that tends to maintain its shape to a certain degree without the presence of a binder may be formed more easily.

Although not particularly limited, examples of inorganic fibers forming the mat include alumina-silica fibers, alumina fibers and silica fibers. These materials may be altered depending on characteristics and the like required for the sealing material, such as heat resistance and wind erosion resistance. When alumina-silica fibers are used as the inorganic fibers, fibers having, for example, a compounding ratio of alumina and silica in the range of about (60:40) to about (80:20) may be used.

The needling treatment can be carried out by using a needling device. The needling device is configured by: a supporting plate for supporting the base mat; and a needle board that is disposed above this supporting plate and capable of moving in a reciprocating manner in a sticking direction (thickness direction of the base mat). A large number of needles are attached to the needle board. This needle board is shifted relative to the base mat mounted on the supporting plate, and the large number of needles are inserted into and removed from the base mat so that the inorganic fibers forming the base mat tend to be entangled complicatedly. The number of the needling treatments and the number of the needles can be altered in accordance with the target bulk density, weight (g) per square meter, and the like.

If necessary, a binder is allowed to adhere to the mat that has thus undergone the needling treatment. By allowing the binder to adhere to the mat, the entangled structure among the inorganic fibers tends to be firmer, and the volume of the mat may be suppressed more easily.

An emulsion, prepared by dispersing an acrylic latex, a rubber latex, or the like, in water, maybe used as the binder. This binder is sprayed evenly over the entire mat by using a spray or the like so that the binder is allowed to adhere to the mat.

Thereafter, in order to remove moisture from the binder, the mat is dried. The drying conditions are set to, for example, at least about 95° C. and at most about 150° C. for at least about 1 minute and at most about 30 minutes.

Moreover, the mat manufactured by the processes is processed by using a cutter, a punching blade or the like into a shape having an adsorption portion and a holding portion, as shown in FIG. 4. By using the processes, a holding sealing material of the present embodiment having the adsorption portion and the holding portion can be manufactured.

Referring to the drawings, the following description will discuss a method for manufacturing an exhaust gas purifying apparatus.

Figure 6:
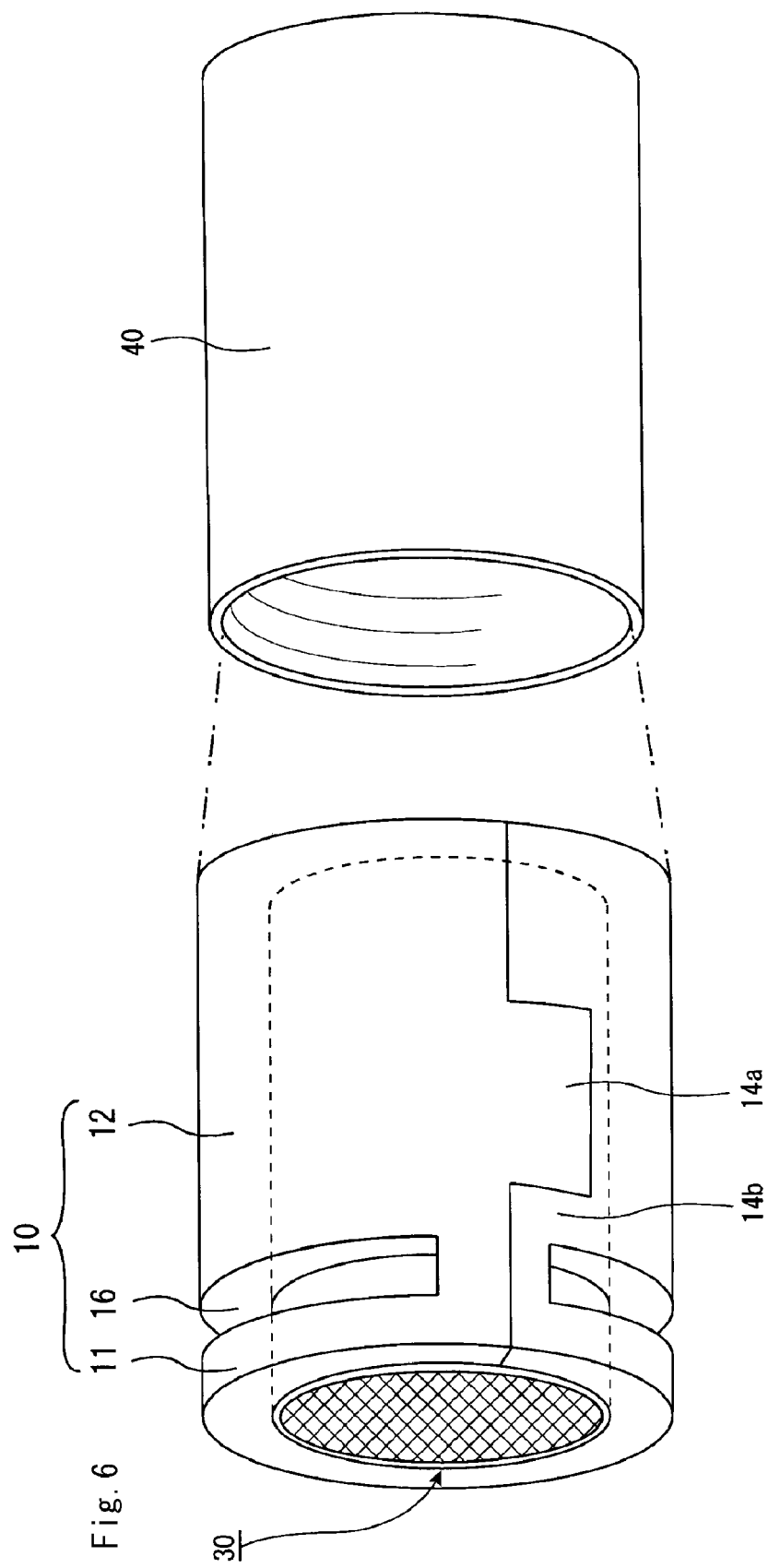
FIG. 6 is a perspective view that schematically shows a sequence of processes for manufacturing the exhaust gas purifying apparatus of the present embodiment.

FIG. 6 is a perspective view that schematically shows a sequence of processes for manufacturing the exhaust gas purifying apparatus of the present embodiment.

A holding sealing material 10, manufactured through the processes, is wound around the periphery of a round pillar-shaped exhaust gas treating body 30 manufactured by a conventionally known method, with its projected portion 14a and recessed portion 14b being fitted to each other.

When the holding sealing material 10 has been wound around, most of an area between the adsorption portion 11 and the holding portion 12 is separated by a space 16.

Then, as shown in FIG. 6, the exhaust gas treating body 30 around which the holding sealing material 10 has been wound is press-fitted into a casing 40 with a round pillar shape having a predetermined size, mainly made of metal and the like; thus, an exhaust gas purifying apparatus is manufactured.

The press-fitting process into the casing is carried out so that the adsorption portion 11 is located on the gas inlet side of the exhaust gas treating body 30.

In an attempt to allow the compressed holding sealing material after the press-fitting process to exert a predetermined repulsive force (that is, a force for holding the exhaust gas treating body), the inner diameter of the casing 40 is slightly smaller than the outermost diameter of the exhaust gas treating body with the holding sealing material 10 wound around, which includes the thickness of the holding sealing material 10.

The following description will summarize the functions and effects of the holding sealing material, the exhaust gas purifying apparatus and the method for manufacturing the exhaust gas purifying apparatus of the present embodiment.

(1) The holding sealing material of the present embodiment has an adsorption portion and a holding portion, and the longer side face of the adsorption portion and the longer side face of the holding portion face each other, with a space interposed therebetween. When the space is formed between the longer side face of the adsorption portion and the longer side face of the holding portion, it may be easier to prevent urea water, absorbed in the adsorption portion, from permeating into the holding portion. For this reason, even when the holding sealing material has been held for a long period under a high temperature in an exhaust gas purifying apparatus used for a urea SCR system, the holding portion of the holding sealing material tends to be prevented from being hardened. Thus, the exhaust gas treating body tends to be kept holding favorably by the holding portion.

(2) Moreover, since the width of the adsorption portion is smaller than the width of the holding portion, most of the function of the holding sealing material for holding the exhaust gas treating body is exerted by the holding portion so that the exhaust gas treating body tends to be kept holding favorably by the holding portion.

(3) Furthermore, since the adsorption portion and the holding portion are coupled to each other through a coupling portion, the holding sealing material tends to be wound around the exhaust gas purifying apparatus by a one-time winding operation; thus, it may be easier to obtain superior operability upon manufacturing an exhaust gas purifying apparatus.

(4) In the exhaust gas purifying apparatus of the present embodiment, the adsorption portion of the holding sealing material of the present embodiment is located on the gas inlet side relative to the holding portion.

With this arrangement, upon applying the exhaust gas purifying apparatus to a urea SCR system, since urea water is more likely to be prevented from permeating into the holding portion, it may be easier to maintain high holding strength even after a long term use of the exhaust gas purifying apparatus.

(5) In the method for manufacturing an exhaust gas purifying apparatus of the present embodiment, the exhaust gas treating body around which the holding sealing material has been wound is inserted into a casing so that the adsorption portion of the holding sealing material is located on the gas inlet side relative to the holding portion. By using these processes, it may be easier to manufacture an exhaust gas purifying apparatus that tends to maintain high holding strength even after it is applied to a urea SCR system and used for a long period.

The following description will discuss an example that specifically discloses the first embodiment of the present invention; however, the present embodiment is not intended to be limited only by this example.

EXAMPLE 1

(1) Assembly of Exhaust Gas Purifying Apparatus

First, an alumina fiber mat having a compounding ratio of $Al_2O_3$:$SiO_2$=72:28, a basis weight of 1160 g/m$^2$ and a density of 0.3 g/cm$^3$ was prepared, and this alumina fiber mat was cut to manufacture a holding sealing material having a shape as shown in FIG. 4.

The holding sealing material, thus manufactured, had a length L of 262 mm, a width W of 83.5 mm and a thickness T of 7.1 mm, with a space 16 (see FIG. 4) being formed into a rectangular shape of 240 mm×10 mm when viewed in a plane, and also had an adsorption portion with a width H of 10 mm and a holding portion with a width K of 63.5 mm.

Moreover, separately from the production of the holding sealing material, there ware prepared: an exhaust gas treating body, made from a ceramic material, having a diameter of 91 mm and a length of 93.5 mm in the longitudinal direction; and a casing, made of stainless steel, having an inner diameter of 100 mm and a length of 115 mm in the longitudinal direction.

Next, the holding sealing material was wound around the periphery of the exhaust gas treating body, and this was further installed into the casing so that an exhaust gas purifying apparatus was assembled.

In this exhaust gas purifying apparatus, the side on which the adsorption portion of the holding sealing material was located corresponded to the gas inlet side.

(2) Immersion of Exhaust Gas Purifying Apparatus Into Urea Water

Figure 7:
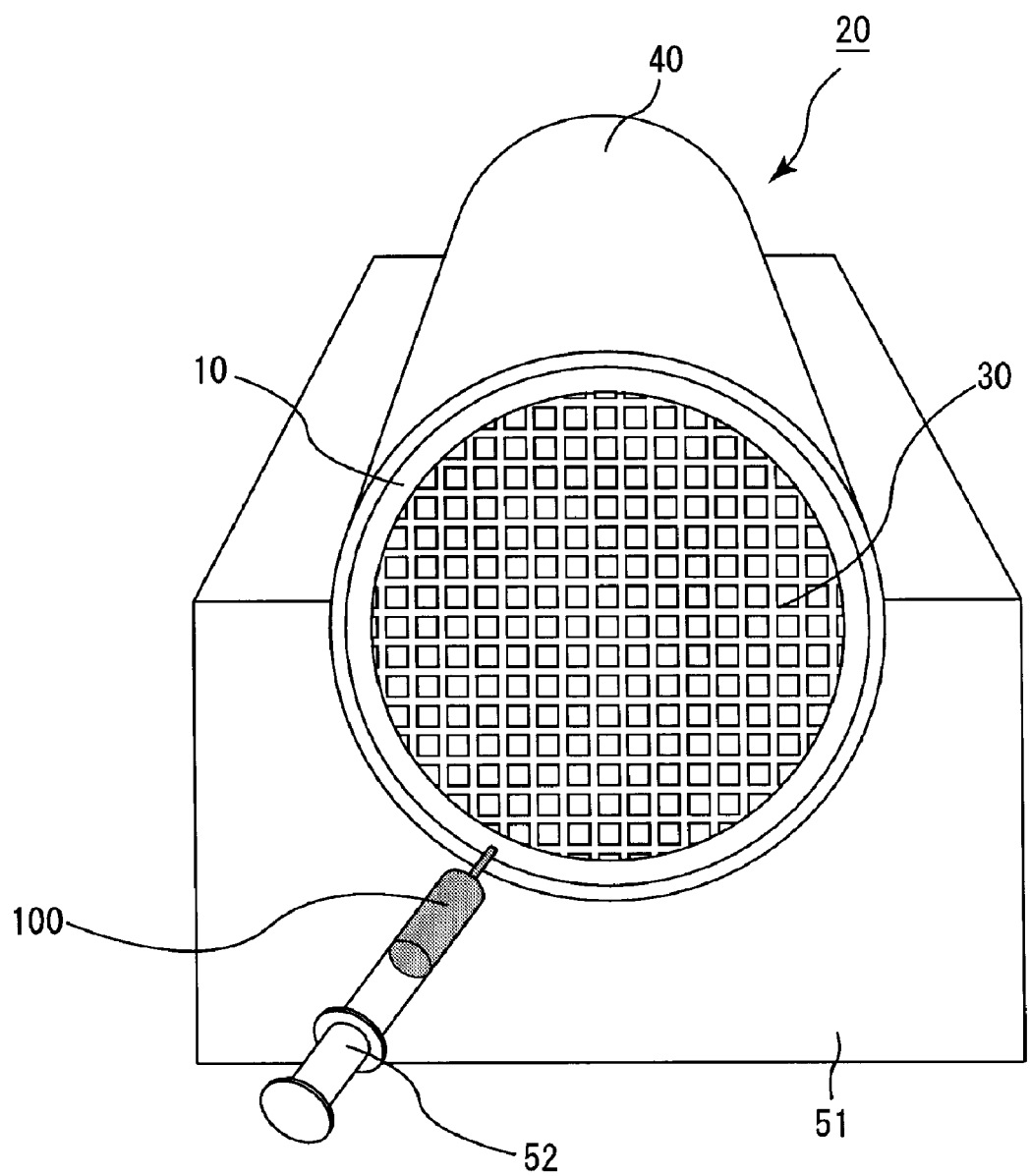
FIG. 7 is a perspective view that schematically shows a state where an exhaust gas purifying apparatus is immersed with urea water.

FIG. 7 is a perspective view that schematically shows a state where an exhaust gas purifying apparatus is immersed with urea water.

As shown in FIG. 7, the exhaust gas purifying apparatus was mounted on a supporting base 51 with a groove having a semicircular shape in its cross section, and 20 ml of urea water (AdBlue, made by Mitsui Chemicals, Inc.) preliminarily colored with a red dye was injected into an exhaust gas purifying apparatus 20 from the gas inlet side by using a syringe 52, and it was left standing for one minute.

In FIG. 7, reference numeral 30 represents an exhaust gas treating body, reference numeral 10 represents a holding sealing material, and reference numeral 40 represents a casing.

(3) Evaluation of Exhaust Gas Purifying Apparatus (a) Degree of Permeation of Urea Water The exhaust gas purifying apparatus 20 was disassembled, and the degree of permeation of urea water in the holding sealing material 10 was observed.

Figure 8A:
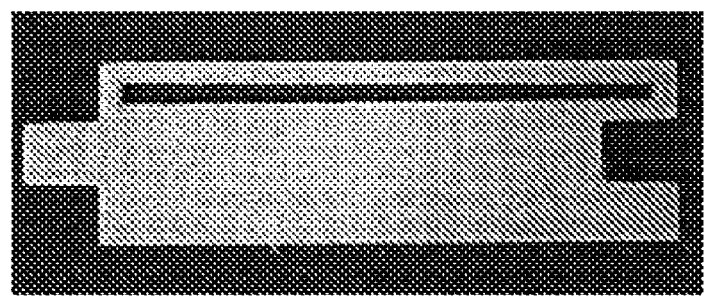
FIG. 8A is a photograph showing a holding sealing material prior to the assembly of the exhaust gas purifying apparatus of Example 1.
Figure 8B:
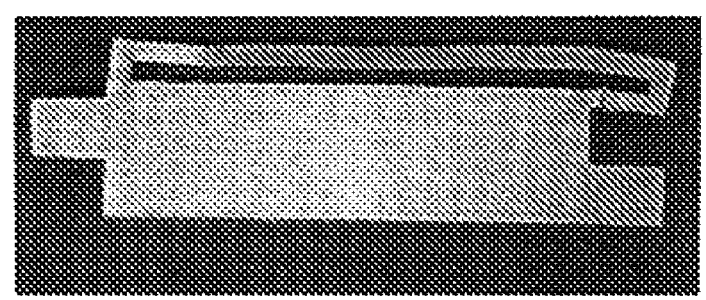
FIG. 8B is a photograph showing the holding sealing material after the exhaust gas purifying apparatus of Example 1 has been disassembled. Moreover.

FIG. 8A is a photograph showing a holding sealing material prior to the assembly of the exhaust gas purifying apparatus of Example 1, and FIG. 8B is a photograph showing the holding sealing material after the exhaust gas purifying apparatus of Example 1 has been disassembled. Moreover, FIG. 8C is a top view that schematically shows an area colored by permeation of the urea water in FIG. 8B.

Upon actual evaluation, a portion with permeated urea water was determined based upon the color (red) of the pigment used for coloring; however, in monochrome photographs shown in FIG. 8A and FIG. 8B, there are blackened portions corresponding to shaded portions and blackened portions colored by permeation of the colored urea water, and these blackened portions make it difficult to determine the evaluation results. For this reason, in FIG. 8C, areas colored by the permeation of urea water in FIG. 8B are schematically indicated by slanting lines.

Figure 8C:
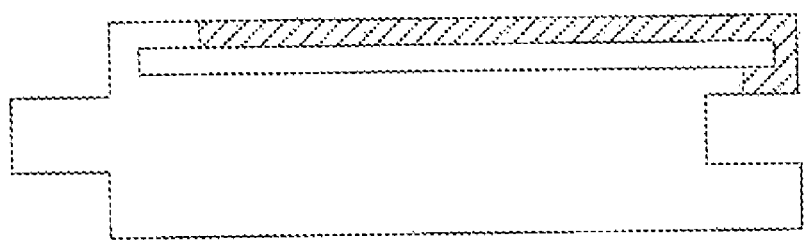
FIG. 8C is a top view that schematically shows an area colored by permeation of the urea water in FIG. 8B.

As shown in FIG. 8B and FIG. 8C, it was clarified that in the present example, urea water is permeated only into the adsorption portion of the holding sealing material, not into the holding portion.

Based upon the above results of observation, the ratio (%) of the area permeated with urea water relative to the area of the holding sealing material was calculated to be 17%.

Since the area of the portion permeated with urea water was calculated, with a wet portion added to the colored portion, the area of the portion permeated with urea water was not identical to the area having only the colored portion.

(b) Increase in Weight of Holding Sealing Material

Moreover, after disassembling the exhaust gas purifying apparatus, the weight of the holding sealing material was measured to be 32.3 g. Prior to assembling the exhaust gas purifying apparatus, the weight of the holding sealing material was 22.6 g. Therefore, the increase rate in the weight of the holding sealing material due to permeated urea water was 51%.

(4) Evaluation on Surface Pressure of Holding Sealing Material

With respect to the holding sealing material before the immersion with urea water and heating and pressing processes, and the holding sealing material after the immersion with urea water and heating and pressing processes, changes in surface pressure were measured by using the following method.

First, a holding sealing material that had been immersed with urea water for one minute and a holding sealing material that had not been immersed with urea water were prepared. Next, each of the holding sealing materials was disposed between heating plates of a press machine, with the temperature of the heating plates being set to 100° C. Moreover, a pressing process was carried out so that the density of the holding sealing material was set to 0.4 g/cm$^3$. The gap between the upper and lower heating plates at this time was defined as "t".

Next, the applied pressure was reduced so that the gap between the upper and lower heating plates became "t+3%, that is, a length corresponding to 103% of t".

These "pressure applying process" and "pressure reducing process" were set to one cycle, and repetitive tests of 1000 cycles were carried out.

With respect to these holding sealing materials that had undergone the repetitive tests of 1000 cycles, the surface pressure applied from the holding sealing material to the heating plates was measured with the gap between the heating plates being set to "t+3%".

As a result, provided that the surface pressure, obtained after carrying out the repetitive tests of 1000 cycles on the holding sealing material that had not been immersed with urea water, was set to 100(%), the surface pressure, obtained after carrying out the repetitive tests of 1000 cycles on the holding sealing material that had been immersed with urea water, was 20(%).

It is confirmed by these tests that, by the immersion with urea water, and heating and pressing processes, the surface pressure of the holding sealing material, that is, the holding strength of the exhaust gas purifying apparatus configured to supporting the exhaust gas treating body, is weakened.

In the exhaust gas purifying apparatus manufactured in Example 1, the ratio (%) of the area of the portion permeated with urea water relative to the area of the holding sealing material was 17%. Therefore, in a case where a load in the same level as that of the repetitive tests of 1000 cycles was applied, the surface pressure of the area of 17% of the total area is expected to be lowered to 20% in comparison with the surface pressure of the sealing material that have no influences of urea water. That is, the surface pressure of the entire holding sealing material is expected to be lowered by 14%.

COMPARATIVE EXAMPLE 1

A holding sealing material having the same shape as that of Example 1, except that it had no space 16 separating the adsorption portion and the holding portion, was manufactured; and an exhaust gas purifying apparatus was assembled in the same manner as in Example 1, except that this holding sealing material was used.

Then, the exhaust gas purifying apparatus of Comparative Example 1 was evaluated for (a) degree of permeated urea water and (b) increase in weight of holding sealing material by the same methods as in Example 1. The results are shown below.

(a) With respect to the degree of permeated urea water, the ratio (%) of the area of the portion permeated with urea water relative to the area of the holding sealing material was 46%.

Figure 9A:
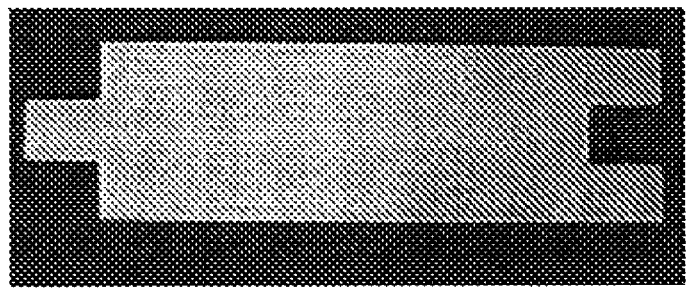
FIG. 9A is a photograph showing a holding sealing material prior to assembling the exhaust gas purifying apparatus of Comparative Example 1.
Figure 9B:
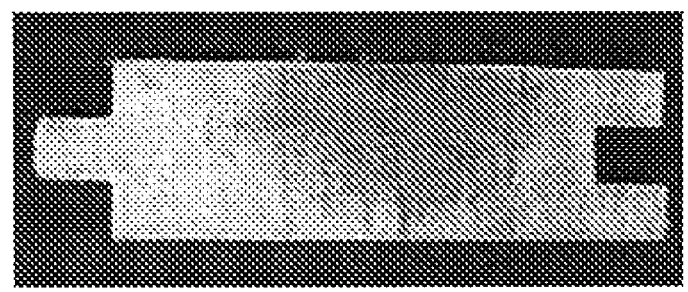
FIG. 9B is a photograph showing a holding sealing material after the exhaust gas purifying apparatus of Comparative Example 1 has been disassembled. Moreover.
Figure 9C:
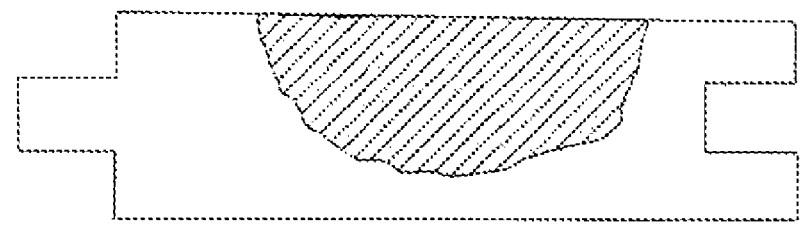
FIG. 9C is a top view that schematically shows an area colored by permeation of the urea water in FIG. 9B.

FIG. 9A is a photograph showing a holding sealing material prior to assembling the exhaust gas purifying apparatus of Comparative Example 1, and FIG. 9B is a photograph showing a holding sealing material after the exhaust gas purifying apparatus of Comparative Example 1 has been disassembled. Moreover, FIG. 9C is a top view that schematically shows an area colored by permeation of the urea water in FIG. 9B.

From these results, the holding strength of the entire holding sealing material is expected to be lowered by 27%.

(b) The increase rate in the weight of the holding sealing material due to permeated urea water was 70%.

The results of Example 1 and Comparative Example 1 clearly indicate that use of the holding sealing material of the first embodiment tends to prevent permeation of urea water into the holding portion so that the exhaust gas treating body tends to be kept holding favorably even after having been held under a high temperature for a long period of time.

Second Embodiment

Referring to the drawings, the following description will discuss a holding sealing material, an exhaust gas purifying apparatus and a method for manufacturing the exhaust gas purifying apparatus according to a second embodiment of the present invention.

Figure 10:
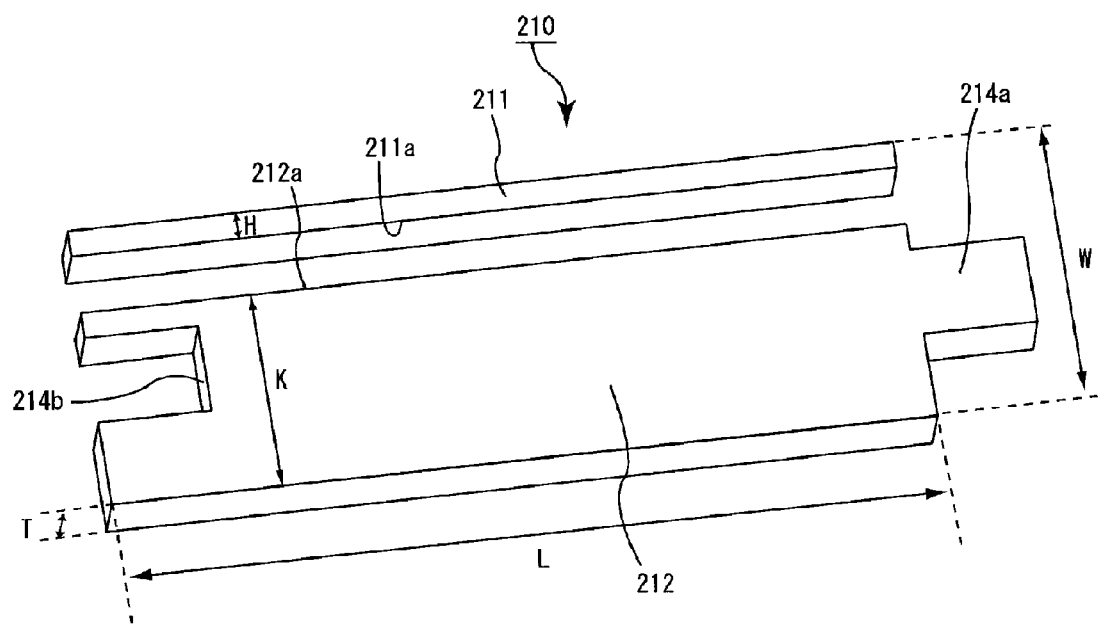
FIG. 10 is a perspective view that schematically shows one example of a holding sealing material in accordance with the second embodiment of the present invention.

FIG. 10 is a perspective view that schematically shows one example of a holding sealing material in accordance with the second embodiment of the present invention.

In the holding sealing material 210 of the present embodiment, a longer side face 211a of an adsorption portion 211 and a longer side face 212a of a holding portion 212 are separated from each other and face each other, as a whole, and the adsorption portion and the holding portion are prepared as different members.

The other structures of the holding sealing material 210 are the same as those of the holding sealing material 10 of the first embodiment. The width H of the adsorption portion 211 is smaller than the width K of the holding portion 212.

Moreover, a projected portion 214a and a recessed portion 214b are formed.

The holding sealing material of the present embodiment can be manufactured through processes in which, after a mat has been manufactured in the same manner as in the method for manufacturing a holding sealing material of the first embodiment, the shape of the mat to be processed by using a cutter and a punching blade is altered.

The exhaust gas treating body and the casing that configure the exhaust gas purifying apparatus of the present embodiment may be the same as those of the first embodiment.

In a case where an exhaust gas purifying apparatus is manufactured by using the holding sealing material of the present embodiment, the adsorption portion and the holding portion are separately wound upon winding the holding sealing material around the exhaust gas treating body. At this time, the holding sealing material is desirably wound around the exhaust gas treating body, with a gap being disposed between the adsorption portion and the holding portion, so that the adsorption portion and the holding portion are not in close contact with each other.

By preparing a gap between the adsorption portion and the holding portion upon winding the holding sealing material around the exhaust gas treating body, an exhaust gas purifying apparatus may be manufactured more easily, with a space being disposed between the adsorption portion and the holding portion, so that urea water tends to be prevented from permeating from the adsorption portion to the holding portion.

In addition to the effects (1), (2), (4) and (5) described in the first embodiment, the present embodiment can exert the following effect.

(6) In the holding sealing material of the present embodiment, the longer side face of an adsorption portion and the longer side face of a holding portion of the holding sealing material are separated from each other and face each other, as a whole, and the adsorption portion and the holding portion are prepared as different members; therefore, by separately winding the adsorption portion and the holding portion around the exhaust gas treating body, an exhaust gas purifying apparatus may be manufactured more easily, with a space being disposed between the adsorption portion and the holding portion. In this case, since the adsorption portion and the holding portion are separated from each other by the space, with no coupled portion located between the adsorption portion and the holding portion, the permeation of urea water into the holding portion tends to be further prevented so that it may be easier to surely prevent the holding portion from being hardened. For this reason, the holding sealing material of the present embodiment may make it easier to maintain higher holding strength even after a long term use, when it is applied to the exhaust gas purifying apparatus used for a urea SCR system.

The following description will discuss an example that specifically discloses the second embodiment of the present invention; however, the present embodiment is not intended to be limited only by this example.

Example 2

(1) Assembly of Exhaust Gas Purifying Apparatus

First, an alumina fiber mat having a compounding ratio of $Al_2O_3:SiO_2=72:28$, a basis weight of 1160 g/m$^2$ and a density of 0.3 g/cm$^3$ was prepared, and this alumina fiber mat was cut to manufacture a holding sealing material having a shape as shown in FIG. 10.

The holding sealing material, thus manufactured, had a length L of 262 mm, a width W of 88.5 mm and a thickness T of 7.1 mm, and the width of the adsorption portion was 10 mm.

Moreover, separately from the formation of the holding sealing material, there ware prepared: an exhaust gas treating body, made from a ceramic material, having a diameter of 91 mm and a length of 93.5 mm in the longitudinal direction; and a casing, made of stainless steel, having an inner diameter of 100 mm and a length of 115 mm in the longitudinal direction.

Next, the holding sealing material was wound around the periphery of the exhaust gas treating body in such a manner that the gap between the adsorption portion and the holding portion was set to 5 mm, and this was further installed into the casing so that an exhaust gas purifying apparatus was assembled.

In this exhaust gas purifying apparatus, the side on which the adsorption portion of the holding sealing material is located corresponded to the gas inlet side.

Then, with respect to the exhaust gas purifying apparatus of Example 2, by using the same method as that of Example 1, (a) degree of permeated urea water and (b) increase in weight of holding sealing material were evaluated. The results are shown below.

(a) With respect to the degree of permeated urea water, the ratio (%) of the area of the portion permeated with urea water relative to the area of the holding sealing material was 14%.

Figure 11A:
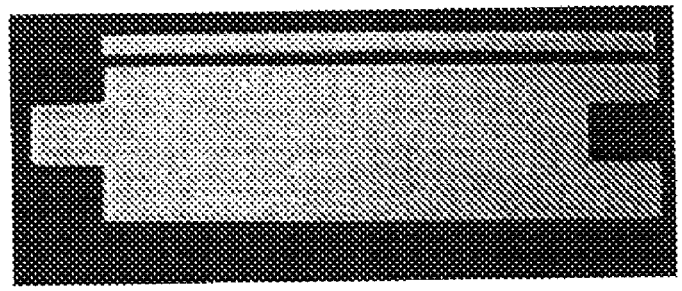
FIG. 11A is a photograph showing a holding sealing material prior to assembling an exhaust gas purifying apparatus of Example 2.
Figure 11B:
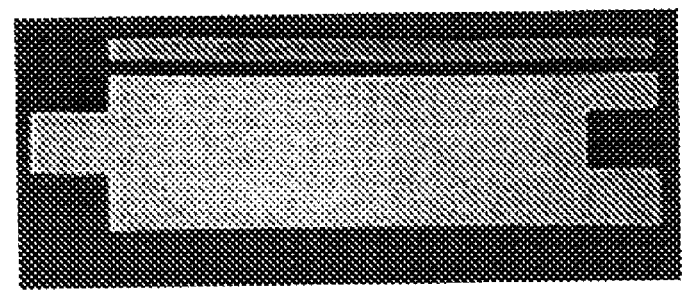
FIG. 11B is a photograph showing a holding sealing material after the exhaust gas purifying apparatus of Example 2 has been disassembled. Moreover.
Figure 11C:
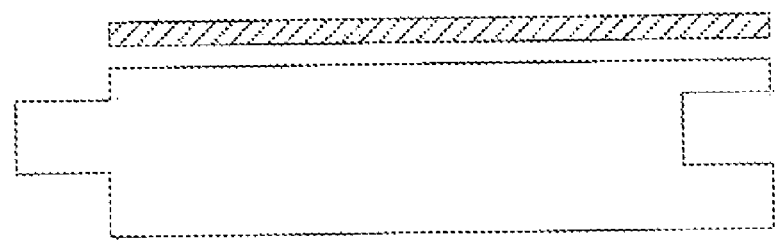
FIG. 11C is a top view that schematically shows an area colored by permeation of the urea water in FIG. 11B.

FIG. 11A is a photograph showing a holding sealing material prior to assembling an exhaust gas purifying apparatus of Example 2, and FIG. 11B is a photograph showing a holding sealing material after the exhaust gas purifying apparatus of Example 2 has been disassembled. Moreover, FIG. 11C is a top view that schematically shows an area colored by permeation of the urea water in FIG. 11B.

From these results, the holding strength of the entire holding sealing material is expected to be lowered by 11%.

(b) The increase rate in the weight of the holding sealing material due to permeated urea water was 46%.

The results of Example 2 and Comparative Example 1 clearly indicate that use of the holding sealing material of the second embodiment tends to further prevent permeation of urea water into the holding portion so that the exhaust gas treating body tends to be kept holding favorably even after having been held under a high temperature for a long period of time.

Third Embodiment

The following description will discuss a holding sealing material, an exhaust gas purifying apparatus and a method for manufacturing the exhaust gas purifying apparatus according to a third embodiment of the present invention.

Figure 12:
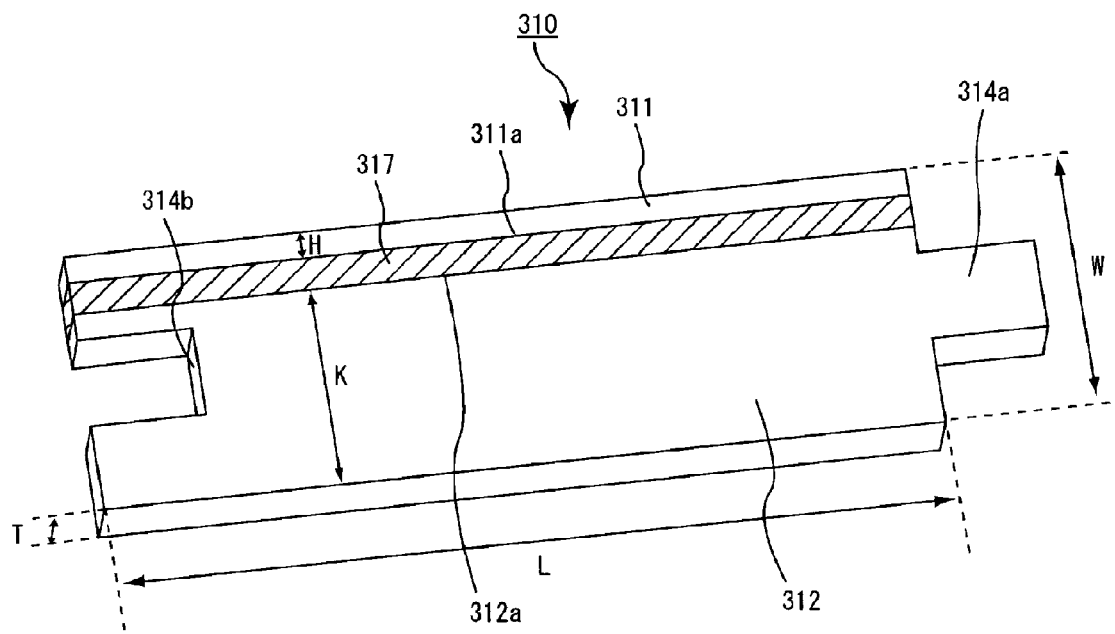
FIG. 12 is a perspective view that schematically shows one example of a holding sealing material in accordance with the third embodiment of the present invention.

FIG. 12 is a perspective view that schematically shows one example of a holding sealing material in accordance with the third embodiment of the present invention.

In a holding sealing material 310 of the present embodiment, a longer side face 311a of an adsorption portion 311 and a longer side face 312a of a holding portion 312 are bonded to each other by a bonding portion 317 including a flammable material.

The shapes of a projected portion 314a and a recessed portion 314b are the same as the shapes of the projected portion and the recessed portion of the first embodiment, and the width H of the adsorption portion 311 is smaller than the width K of the holding portion 312.

The shapes of the adsorption portion 311 and the holding portion 312 are the same as the shapes of the adsorption portion and the holding portion of the holding sealing material of the second embodiment, and the longer side face 311a of the adsorption portion 311 and the longer side face 312a of the holding portion 312 are separated from each other and face each other, as a whole.

The bonding portion 317, which bonds the longer side face 311a of the adsorption portion 311 and the longer side face 312a of the holding portion 312 to each other, includes a flammable material. The flammable material refers to such a material having heat resistance lower than that of the adsorption portion and the holding portion that it disappears by a temperature rise inside an exhaust gas purifying apparatus, when the holding sealing material is disposed inside the exhaust gas purifying apparatus and undergoes repetitive driving operations.

More specifically, the material is desirably designed so that, when undergoing a heat treatment at about 600° C. for about one hour, it has a weight reduction of about 90% or more.

Although not particularly limited as long as it is the flammable material and capable of bonding the longer side face 311a of the adsorption portion 311 and the longer side face 312a of the holding portion 312 to each other, examples of the material of the bonding portion 317 include inorganic fibers, pulp, and the like.

The holding sealing material according to the embodiment of the present invention may be manufactured by using processes in which, after a holding sealing material having an adsorption portion and a holding portion prepared as different members has been manufactured in the same manner as in the method for manufacturing a holding sealing material of the second embodiment, a bonding agent to form a bonding portion is injected into a gap between the longer side face of the adsorption portion and the longer side face of the holding portion and the bonding strength of the bonding agent is exerted (for example, through a drying process or a hardening process of the bonding agent).

The exhaust gas treating body and the casing that configure the exhaust gas purifying apparatus of the present embodiment may have the same structures as those of the first embodiment.

The method for manufacturing an exhaust gas purifying apparatus by using the holding sealing material of the present embodiment is the same as that of the first embodiment.

In the exhaust gas purifying apparatus manufactured in the present embodiment, the bonding portion, including a flammable material, burns and disappears upon application of heat to the exhaust gas purifying apparatus by high-temperature exhaust gases that are allowed to flow therein, with the result that a portion in which the bonding portion existed is formed into a space: a space between the adsorption portion and the holding portion. The space, formed between the adsorption portion and the holding portion, may make it easier to prevent urea water from permeating into the holding portion from the adsorption portion.

Although FIG. 12 shows an example in which a bonding portion is injected between the longer side face of the adsorption portion and the longer side face of the holding portion without any gap, the bonding portion may be formed only at one portion of the gap between the longer side face of the adsorption portion and the longer side face of the holding portion.

Figure 13:
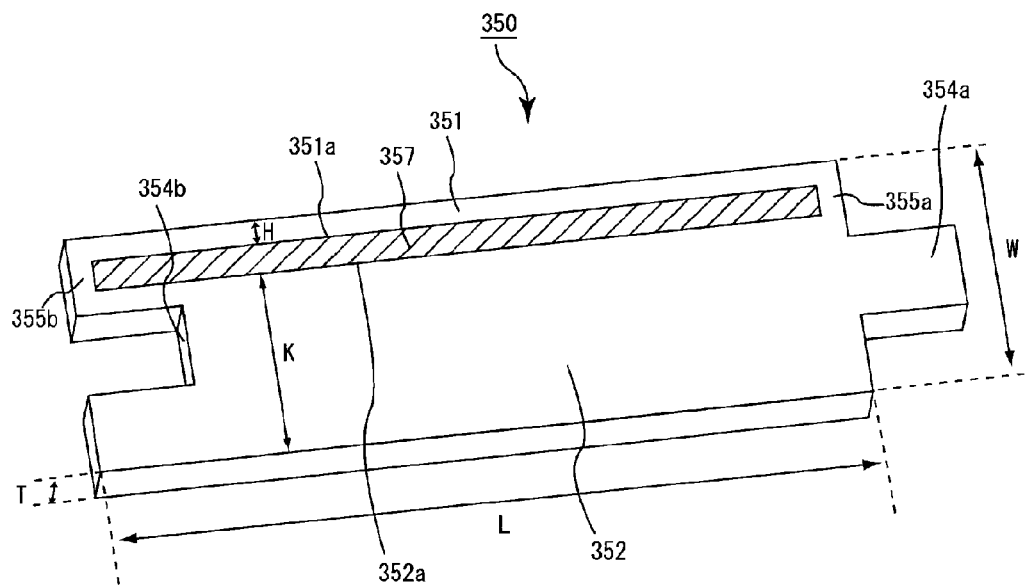
FIG. 13 is a perspective view that schematically shows another example of a holding sealing material in accordance with the third embodiment of the present invention.

FIG. 13 is a perspective view that schematically shows another example of a holding sealing material in accordance with the third embodiment of the present invention.

In the holding sealing material 350 shown in FIG. 13, a bonding portion 357 is formed at a portion that corresponds to a space in the holding sealing material shown in the first embodiment.

In the holding sealing material 350, the longer side face 351a of an adsorption portion 351 and the longer side face 352a of a holding portion 352 are bonded to each other by a bonding portion 357, and the adsorption portion 351 and the holding portion 352 are coupled to each other through coupling portions 355a and 355b. Moreover, a projected portion 354a and a recessed portion 354b are also formed.

In such a holding sealing material 350, the bonding portion 357 includes the same flammable material as in the bonding portion 317 used for the holding sealing material 310 shown in FIG. 12. For this reason, the holding sealing material 350 shown in FIG. 13 may be used as a holding sealing material forming one component of an exhaust gas purifying apparatus in the same manner as in the holding sealing material 310 shown in FIG. 12.

In addition to the effects (1) to (5) described in the first embodiment, the present embodiment can exert the following effect.

(7) In the holding sealing material of the present embodiment, since the adsorption portion and the holding portion are bonded to each other through the bonding portion, the holding sealing material tends to be wound around an exhaust gas treating body by a one-time winding operation; thus, it may be easier to obtain superior operability upon manufacturing an exhaust gas purifying apparatus.

Moreover, since the bonding portion includes a flammable material, the bonding portion burns and disappears by a temperature rise inside the exhaust gas purifying apparatus, when used in an exhaust gas purifying apparatus, with the result that a portion in which the bonding portion existed is formed into a space. That is, the space may be formed more easily between the adsorption portion and the holding portion, with the result that no coupled portion tends to exist between the adsorption portion and the holding portion.

When no coupled portion is located between the adsorption portion and the holding portion, it may be easier to further prevent urea water from permeating into the holding portion from the adsorption portion, and consequently to surely prevent the holding portion from being hardened. For this reason, the holding sealing material of the present embodiment may make it easier to maintain higher holding strength even after a long term use when applied to an exhaust gas purifying apparatus to be used for a urea SCR system.

Fourth Embodiment

The following description will discuss a holding sealing material, an exhaust gas purifying apparatus and a method for manufacturing the exhaust gas purifying apparatus according to a fourth embodiment of the present invention.

Figure 14:
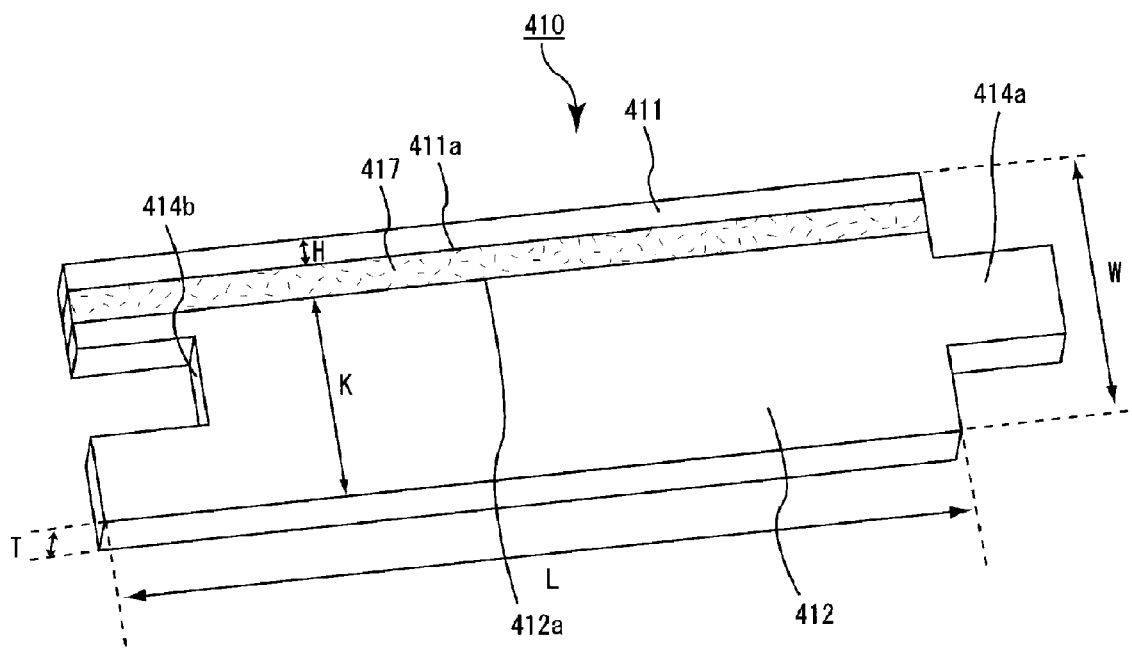
FIG. 14 is a perspective view that schematically shows one example of a holding sealing material in accordance with the fourth embodiment of the present invention.

FIG. 14 is a perspective view that schematically shows one example of a holding sealing material in accordance with the fourth embodiment of the present invention.

In a holding sealing material 410 of the present embodiment, a holding member 417 is disposed between the longer side face 411a of an adsorption portion 411 and the longer side face 412a of a holding portion 412, the holding member 417 including a material that hardly adsorbs liquid in comparison with an adsorption portion 411.

The shapes of a projected portion 414a and a recessed portion 414b are the same as the projected portion and the recessed portion of the first embodiment, and the width H of the adsorption portion 411 is smaller than the width K of the holding portion 412.

Although the structure of the holding member is not particularly limited, FIG. 14 exemplifies a structure in which the holding member includes a material having a porosity smaller than that of the material of the adsorption portion.

The material having a small porosity hardly absorbs liquid from an adjacent material through a capillary phenomenon. That is, the holding member including a material having a small porosity is such a member that the amount of liquid moving from the adsorption portion 411 to the holding member 417 is small.

Examples of the material having a low porosity that can be used as the holding member include alumina fibers, aluminosilicate fibers, silicate fibers, alkaline earth silicate fibers (biosoluble fibers), and the like.

Examples of the method for manufacturing a holding sealing material in which a material having a low porosity is used as the holding member include: a method in which, after manufacturing a holding sealing material with an adsorption portion and a holding portion being separated from each other in the same manner as in the method for manufacturing the holding sealing material of the second embodiment, a holding member is disposed between the longer side face of the adsorption portion and the longer side face of the holding portion, and the holding member and the adsorption portion, as well as the holding member and the holding portion, are bonded to each other by a bonding agent having high heat resistance.

Figure 15:
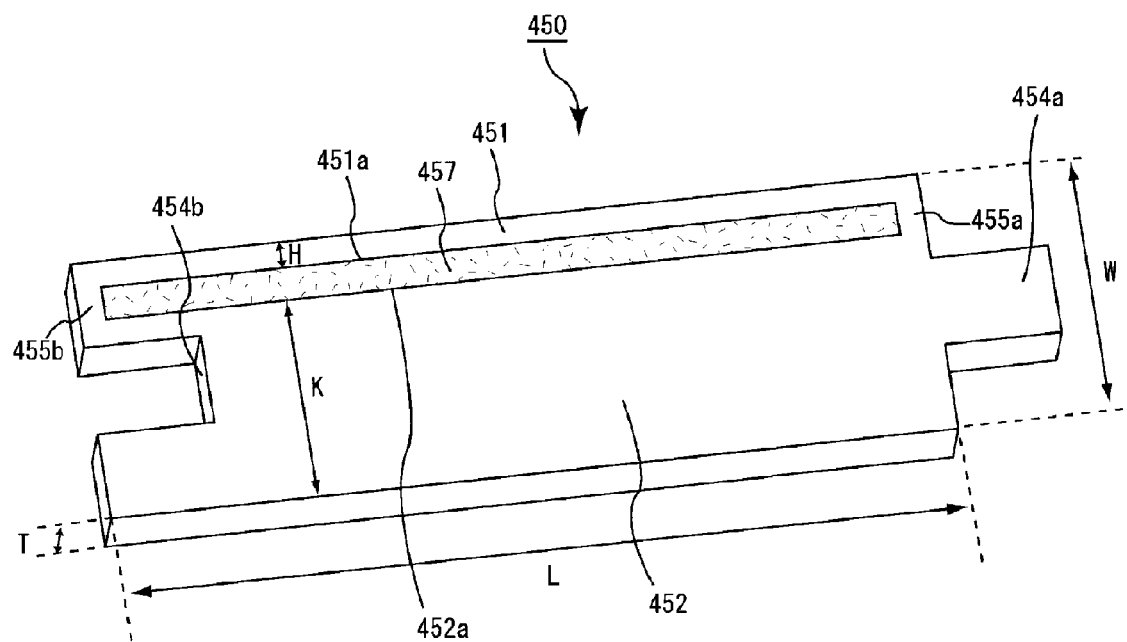
FIG. 15 is a perspective view that schematically shows another example of the holding sealing material in accordance with the fourth embodiment of the present invention.

FIG. 15 is a perspective view that schematically shows another example of the holding sealing material in accordance with the fourth embodiment of the present invention.

In a holding sealing material 450 shown in FIG. 15, a holding member 457 is disposed at a portion that was a space in the holding sealing material shown in the first embodiment.

In the holding sealing material 450, the holding member 457 is disposed between the longer side face 451a of an adsorption portion 451 and the longer side face 452a of a holding portion 452, and the adsorption portion 451 and the holding portion 452 are coupled to each other by coupling portions 455a and 455b.

Moreover, a projected portion 454a and a recessed portion 454b are also formed.

In the same manner as in the holding member 417 used for the holding sealing material 410 shown in FIG. 14, the holding member 457 in the holding sealing material 450 includes a material that has a porosity smaller than that of the material of the adsorption portion.

The holding sealing material 450 having this structure may also be used as the holding sealing material of the present embodiment.

Figure 16:
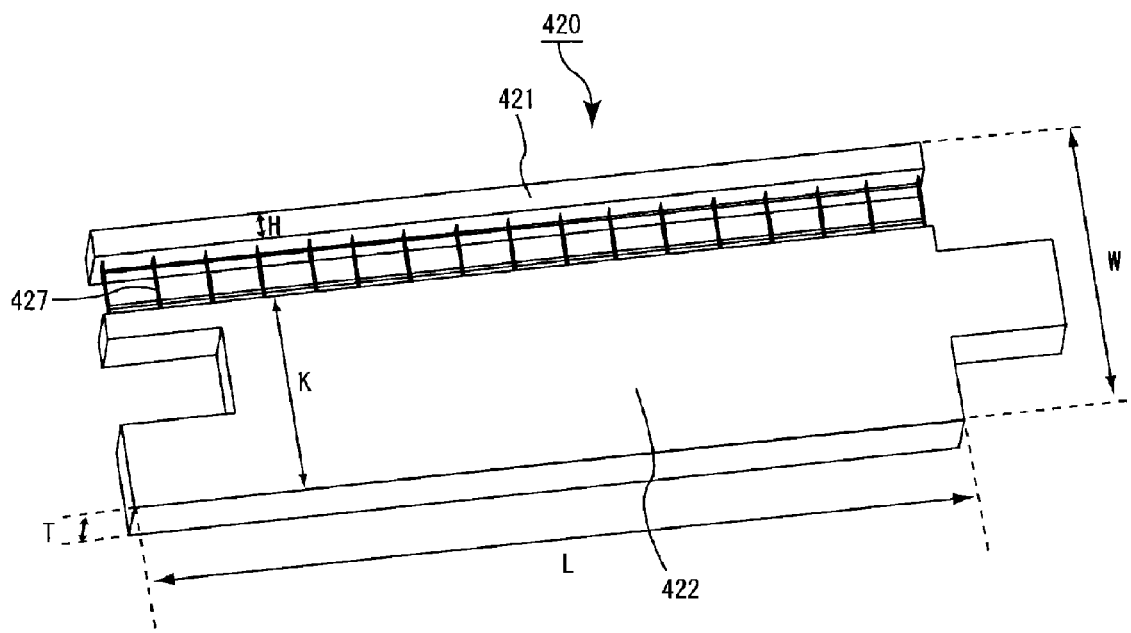
FIG. 16 is a perspective view that schematically shows another example of a holding sealing material in accordance with the fourth embodiment of the present invention.

As shown in FIG. 16, a wire mesh may be used as the holding member.

FIG. 16 is a perspective view that schematically shows another example of a holding sealing material in accordance with the fourth embodiment of the present invention.

The holding sealing material 420, shown in FIG. 16, is the same as the holding sealing material 410 shown in FIG. 14 except that a wire mesh 427 is used as the holding member; and the holding sealing material 420 has an adsorption portion 421 and a holding portion 422.

Since the wire mesh does not absorb liquid, the amount of liquid that moves from the adsorption portion 421 to the wire mesh 427 is smaller.

Examples of a method for manufacturing the holding sealing material using a wire mesh as the holding member include a method in which, after manufacturing a holding sealing material having an adsorption portion and a holding portion separated from each other in the same manner as in the method for manufacturing the holding sealing material of the second embodiment, a wire mesh is disposed between the longer side face of the adsorption portion and the longer side face of the holding portion, with metal wires of the wire mesh being stuck into the longer side faces of the adsorption portion and the holding portion.

Figure 17:
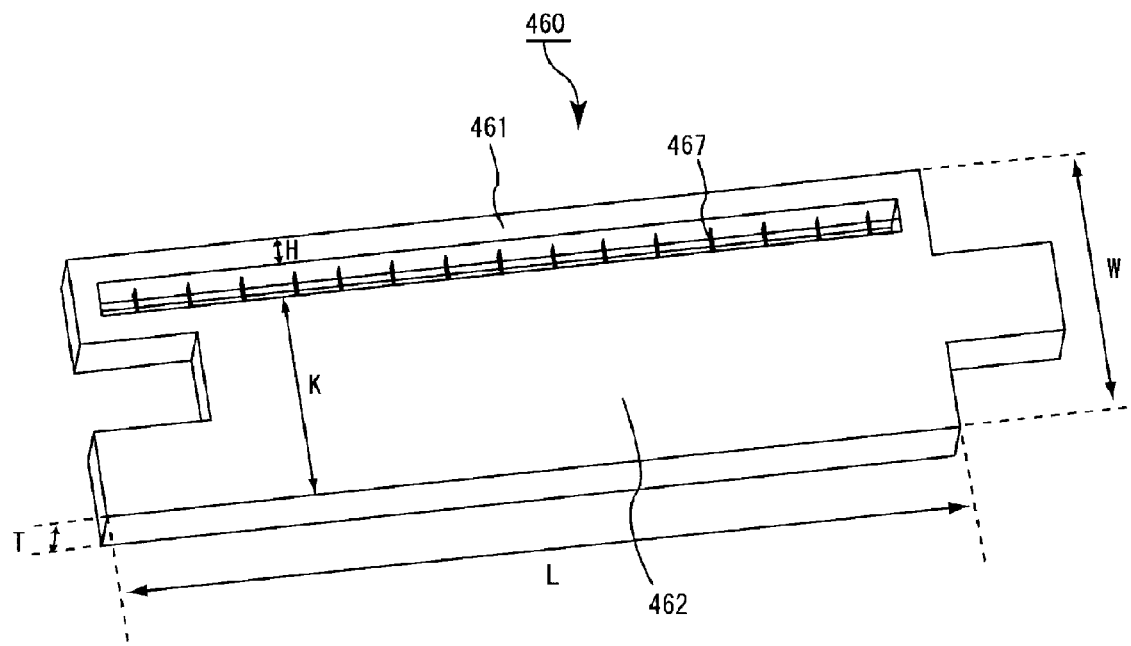
FIG. 17 is a perspective view that schematically shows still another example of a holding sealing material in accordance with the fourth embodiment of the present invention.

FIG. 17 is a perspective view that schematically shows still another example of a holding sealing material in accordance with the fourth embodiment of the present invention.

The holding sealing material 460, shown in FIG. 17, is provided with an adsorption portion 461 and a holding portion 462, and a holding member 467 made of a wire mesh is disposed at a portion that corresponds to a space in the holding sealing material shown in the first embodiment.

The holding sealing material 460 having this structure may also be used as the holding sealing material of the present embodiment.

The exhaust gas treating body and the casing that form the exhaust gas purifying apparatus of the present embodiment may have the same structures as those of the first embodiment.

The method for manufacturing an exhaust gas purifying apparatus by using the holding sealing material of the present embodiment may be the same as that of the first embodiment.

In the exhaust gas purifying apparatus manufactured in the present embodiment, even when urea water is absorbed in the adsorption portion, the urea water is hardly absorbed in the holding member so that the urea water tends to be prevented from permeating into the holding portion.

In addition to the effects (1) to (5) described in the first embodiment, the present embodiment can exert the following effect.

(8) In the holding sealing material of the present embodiment, since the adsorption portion and the holding portion are coupled to each other by the holding member, the holding sealing material tends to be wound around an exhaust gas treating body by a one-time winding operation; thus, it may be easier to obtain superior operability upon manufacturing an exhaust gas purifying apparatus.

Moreover, since the holding member includes a material that hardly absorbs liquid, and since the adsorption portion and the holding portion are not coupled to each other by a material that easily absorbs liquid, urea water may prevented more easily from further permeating into the holding portion from the adsorption portion so that it may be easier to surely prevent the holding member from being hardened. For this reason, the holding sealing material of the present embodiment is more likely to maintain high holding strength even after a long term use, when applied to an exhaust gas purifying apparatus used for a urea SCR system.

Fifth Embodiment

The following description will discuss a holding sealing material, an exhaust gas purifying apparatus and a method for manufacturing the exhaust gas purifying apparatus according to a fifth embodiment of the present invention.

Figure 18:
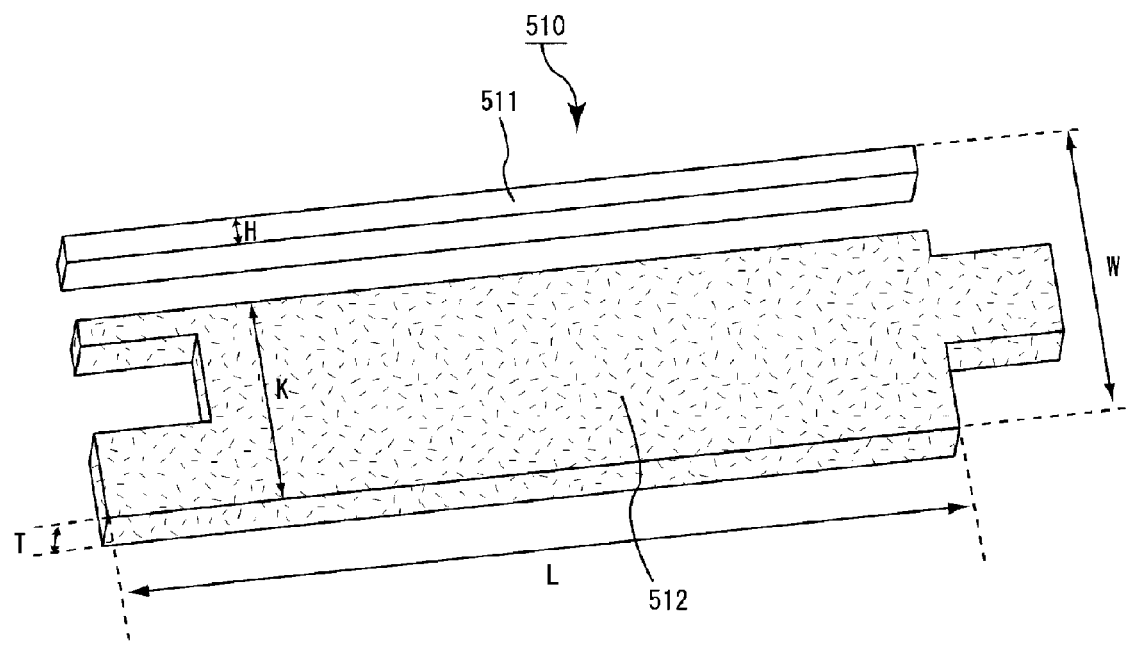
FIG. 18 is a perspective view that schematically shows one example of a holding sealing material in accordance with the fifth embodiment of the present invention.

FIG. 18 is a perspective view that schematically shows one example of a holding sealing material in accordance with the fifth embodiment of the present invention.

A holding sealing material 510 of the present embodiment has an adsorption portion 511 and a holding portion 512 that include different materials so that those materials allow the adsorption portion to have a porosity greater than the porosity of the holding portion.

More specifically, the adsorption portion 511 and the holding portion 512 forming the holding sealing material 510 of the present embodiment include inorganic fibers, and the average fiber diameter of the inorganic fibers forming the adsorption portion 511 is smaller than the average fiber diameter of the inorganic fibers forming the holding portion 512.

When the adsorption portion 511 and the holding portion 512 include such materials, liquid is hardly allowed to move from the adsorption portion to the holding portion.

Examples of the method for manufacturing a holding sealing material of the present embodiment include a method in which, after preparing a needle mat (referred to as a "needle mat A") including a raw material of inorganic fibers having a short average fiber diameter and a needle mat (referred to as a "needle mat B") including a raw material of inorganic fibers having a long average fiber diameter, the needle mat A is processed into a predetermined shape to form an adsorption portion, while the needle mat B is processed into a predetermined shape to form a holding portion.

Figure 19:
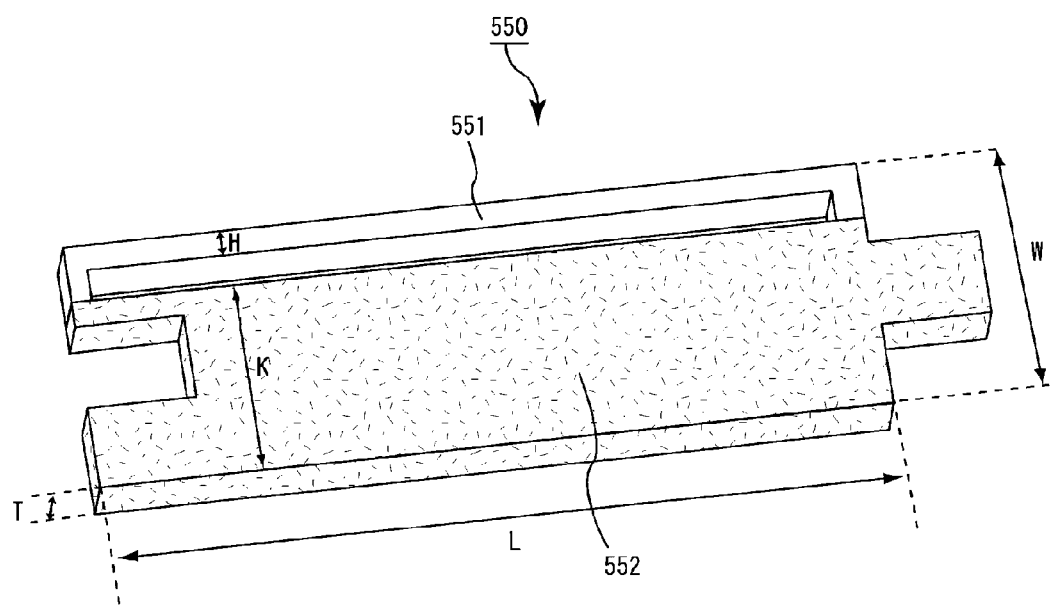
FIG. 19 is a perspective view that schematically shows one example of a holding sealing material in accordance with the fifth embodiment of the present invention.

FIG. 19 is a perspective view that schematically shows one example of a holding sealing material in accordance with the fifth embodiment of the present invention.

A holding sealing material 550, shown in FIG. 19, has the same shape as that of the holding sealing material of the first embodiment, and is provided with an adsorption portion 551 and a holding portion 552 that include different materials.

The same materials as those forming the adsorption portion 511 and the holding portion 512 shown in FIG. 18 may be used as the materials for the adsorption portion 551 and the holding portion 552.

Examples of the method for manufacturing the holding sealing material 550 include a method in which, after preparing two kinds of needle mats respectively processed into the same shapes as those of the adsorption portion 551 and the holding portion 552, a portion forming a border between the adsorption portion 551 and the holding portion 552 is bonded by a heat-resistant bonding agent; and a method in which the two members are joined to each other by allowing metal wires or the like to be stuck into them.

The holding sealing material 550 having this structure may also be used as the holding sealing material of the present embodiment.

The exhaust gas treating body and the casing that form the exhaust gas purifying apparatus of the present embodiment may have the same structures as those of the first embodiment. The method for manufacturing an exhaust gas purifying apparatus by using the holding sealing material of the present embodiment may be the same as that of the second embodiment.

In addition to the effects (1), (2), (4) and (5) described in the first embodiment, the present embodiment can exert the following effect.

(9) In the holding sealing material of the present embodiment, the adsorption portion includes inorganic fibers having a short average fiber diameter, and the porosity of the adsorption portion is made higher than the porosity of the holding portion. Therefore, it is possible to make liquid less likely to permeate into the holding portion from the adsorption portion. For this reason, upon applying the holding sealing material to an exhaust gas purifying apparatus to be used for a urea SCR system, it may be easier to surely prevent urea water from permeating into the holding portion, and consequently to maintain high holding strength even after a long term use of the exhaust gas purifying apparatus.

Other Embodiments

The shapes of a recessed portion and a projected portion that are formed on a shorter side of the holding sealing material according to the embodiments of the present invention is not particularly limited as long as the shapes tend to enable the recessed portion to be fitted to the projected portion. In the case where one set of a recessed portion and a projected portion is formed, desirably, the projected portion that projects over a size from about 10 mm in width×about 10 mm in length to about 300 mm in width×about 100 mm in length is formed on one portion of a longer side on one side, and the recessed portion that is fitted to the projected portion is formed on one portion of a longer side on the other side. In the case where an exhaust gas purifying apparatus is manufactured using the holding sealing material having such shapes of the recessed portion and the projected portion, an exhaust gas treating body tends to be surely held by the holding sealing material, leading to excellent handleability.

In addition, a plurality of recessed portions and projected portions that are fitted to each other may be formed in the shorter side of the holding sealing material, or recessed portions and projected portions may not be formed therein.

In the holding sealing material according to the embodiments of the present invention, the average fiber length of inorganic fibers is desirably at least about 30 μm and at most about 120 mm, and more desirably in the range of about 50 μm to about 100 mm.

In the holding sealing material according to the embodiments of the present invention, the average fiber diameter of inorganic fibers is desirably at least about 2 μm and at most about 12 μm, and more desirably in the range of about 3 μm and about 10 μm.

The amount of a binder contained in the holding sealing material according to the embodiments of the present invention is desirably at least about 0.2% by weight and at most about 20% by weight, more desirably in the range of about 0.5% by weight to about 15% by weight, and most desirably in the range of about 1% by weight to about 12% by weight. In a case where the amount of the binder is about 0.2% by weight or more, since the bulk density of the holding sealing material tends not to be low, the press-injecting property of the holding sealing material into the casing tends not to be lowered, and the inorganic fibers forming the holding sealing material is more likely to be sufficiently bonded to one another, with the result that the inorganic fibers may tend not to be scattered. In contrast, in a case where the amount of the binder of about 20.0% by weight or less, since, upon use of an exhaust gas purifying apparatus, the amount of organic components in exhaust gases to be discharged tends not to increase, a higher load is less likely to be applied to the environment.

Although not particularly limited, the weight (g) per square meter of the holding sealing material according to the embodiments of the present invention is desirably at least about 200 g/m² and at most about 2000 g/m², and more desirably in the range of about 300 g/m² to about 1900 g/m². Although not particularly limited, the bulk density thereof is desirably at least about 0.10 g/cm³ and at most about 0.30 g/cm³.

The organic binder used for manufacturing the holding sealing material according to the embodiments of the present invention is not limited to the acrylic-based resin, and examples thereof include: rubbers such as acrylic rubber; water-soluble organic polymers such as carboxymethyl cellulose or polyvinyl alcohol; thermoplastic resins such as styrene resin; thermosetting resins such as epoxy resin; and the like. Particularly preferred among these are acrylic rubber, acrylonitrile-butadiene rubber, and styrene-butadiene rubber.

The emulsion may include a plurality of kinds of the above-mentioned organic binders.

Examples of the emulsion include: a latex in which the above-mentioned organic binder is dispersed in water; a solution in which the above-mentioned organic binder is dissolved in water or an organic solvent; and the like.

Not limited to the alumina sol, examples of the inorganic binder to be used for manufacturing the holding sealing material according to the embodiments of the present invention include silica sol and the like.

Although not particularly limited as long as it is a heat-resistant metal, examples of the material for the casing forming one component of the exhaust gas purifying apparatus according to the embodiments of the present invention include metals, such as stainless steel, aluminum and iron.

Additionally, in a case where an exhaust gas purifying apparatus is manufactured by using a round pillar-shaped casing, what is called a sizing system may be used to manufacture the exhaust gas purifying apparatus, in which, after an exhaust gas treating body, with a holding sealing material being wound around, has been inserted into a casing having an inner diameter larger than the total combined length of the diameter of the end face of the exhaust gas treating body and the thickness of the holding sealing material that has been wound around the exhaust gas treating body, the casing is compressed from the peripheral side by a pressing machine or the like.

The exhaust gas treating body forming one component of the exhaust gas purifying apparatus according to the embodiments of the present invention may be prepared as an integral exhaust gas treating body configured by one sintered body as a whole, shown in FIG. 5A, or may be prepared as an aggregated exhaust gas treating body obtained by combining a plurality of honeycomb fired bodies, each having a structure in which a large number of through holes are longitudinally disposed in parallel with one another, with a partition wall being interposed therebetween, by using adhesive layers.

Examples of the material of the exhaust gas treating body include cordierite, aluminum titanate, and the like. Examples of the exhaust gas treating body include porous ceramics including: inorganic particles composed of alumina, silica, zirconia, titania, ceria, mullite, zeolite, and the like; and inorganic fibers and/or whiskers; and inorganic binders.

The exhaust gas treating body that configures the exhaust gas purifying apparatus according to the embodiments of the present invention may be what is called a DPF (Diesel Particulate Filter) in which one end portion of the through hole is sealed.

In this case, examples of the exhaust gas treating body include porous ceramics including: nitride ceramics such as aluminum nitride, silicon nitride, boron nitride, and titanium nitride; carbide ceramics such as silicon carbide, zirconium carbide, titanium carbide, tantalum carbide, and tungsten carbide; and oxide ceramics such as alumina, zirconia, cordierite, mullite, and aluminum titanate; and the like.

Examples of the method for applying a catalyst to the exhaust gas treating body include: a method in which the exhaust gas treating body is impregnated with a solution containing a catalyst and then heated; a method for forming a catalyst supporting layer consisting of an alumina film and applying a catalyst to the alumina film; and the like.

Examples of the method for forming the alumina film include: a method in which the exhaust gas treating body is impregnated with a solution of a metal compound containing aluminum such as $Al(NO_3)_3$ and then heated; a method in which the gas treating body is impregnated with a solution containing alumina powder and then heated; and the like.

Examples of the method for applying a catalyst to the alumina film include: a method in which the exhaust gas treating body is impregnated with a solution containing an alkaline metal, an alkaline earth metal, and a metal oxide, and the like, and then heated; and the like.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A holding sealing material having a mat shape, comprising:
   an adsorption portion configured to adsorb urea and having a width and a longer side face;
   a holding portion configured to hold an exhaust gas treating body and having another width and another longer side face, the width of the adsorption portion being smaller than the another width of the holding portion, the longer side face facing the another longer side face via a space; and
   a coupling portion connecting the adsorption portion and the holding portion.

2. The holding sealing material according to claim 1, further comprising:
   a bonding portion comprising a flammable material and connecting the longer side face of said adsorption portion and the another longer side face of said holding portion.

3. The holding sealing material according to claim 1, further comprising:
   a holding member disposed between the longer side face of said adsorption portion and the another longer side face of said holding portion, said holding member comprising a material that hardly absorbs liquid in comparison with said adsorption portion.

4. The holding sealing material according to claim 3, wherein said holding member comprises a material having a porosity smaller than a porosity of said adsorption portion.

5. The holding sealing material according to claim 3, wherein said holding member comprises a wire mesh.

6. The holding sealing material according to claim 1, wherein said adsorption portion and said holding portion comprise different materials.

7. The holding sealing material according to claim 6, wherein said adsorption portion comprises a material having a porosity larger than a porosity of said holding portion.

8. The holding sealing material according to claim 7, wherein said adsorption portion and said holding portion comprise inorganic fibers, and said inorganic fibers forming said adsorption portion have an average fiber diameter that is smaller than an average fiber diameter of said inorganic fibers forming said holding portion.

* * * * *